US009679125B2

(12) United States Patent
Bailor et al.

(10) Patent No.: US 9,679,125 B2
(45) Date of Patent: Jun. 13, 2017

(54) CHARACTERIZING USER BEHAVIOR VIA INTELLIGENT IDENTITY ANALYTICS

(71) Applicant: PEGRight, Inc., Colorado Springs, CO (US)

(72) Inventors: Paul Dennis Bailor, Colorado Springs, CO (US); Eric Louis Uythoven, Colorado Springs, CO (US)

(73) Assignee: PEGRight, Inc., Colorado Springs, CO (US)

( * ) Notice: Subject to any disclaimer, the term of this patent is extended or adjusted under 35 U.S.C. 154(b) by 4 days.

(21) Appl. No.: 14/699,086

(22) Filed: Apr. 29, 2015

(65) Prior Publication Data
US 2015/0310195 A1 Oct. 29, 2015

Related U.S. Application Data

(60) Provisional application No. 61/985,955, filed on Apr. 29, 2014.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/31* | (2013.01) |
| *G06N 99/00* | (2010.01) |
| *G06F 21/45* | (2013.01) |

(52) U.S. Cl.
CPC ............ *G06F 21/316* (2013.01); *G06F 21/45* (2013.01); *G06N 99/005* (2013.01)

(58) Field of Classification Search
CPC ... H04L 63/083; H04L 63/08; H04L 63/0876; H04W 12/06; G06F 21/45

USPC .......................................................... 726/6
See application file for complete search history.

(56) References Cited

U.S. PATENT DOCUMENTS

| | | | |
|---|---|---|---|
| 2010/0114617 A1 | 5/2010 | Bobbitt et al. | |
| 2012/0137360 A1 | 5/2012 | Henderson | |
| 2013/0055367 A1 | 2/2013 | Dshirsagar et al. | |
| 2013/0347125 A1 | 12/2013 | Rezlan et al. | |
| 2014/0172864 A1* | 6/2014 | Shum .................... | G06F 19/322 707/740 |

(Continued)

OTHER PUBLICATIONS

International Search Report and Written Opinion for International (PCT) Patent Application No. PCT/US15/28133, mailed Aug. 4, 2015 8 pages.

*Primary Examiner* — Kambiz Zand
*Assistant Examiner* — Stephen Sanders
(74) *Attorney, Agent, or Firm* — Sheridan Ross P.C.

(57) ABSTRACT

Methods, devices, and systems are provided to rapidly detect and prevent cyber-attacks that are enabled by either misuse of identity credentials or weaknesses within the identity credential lifecycle. An Identity Analytics and Intelligence Engine provides an automated process for the collection, exchange, analysis, correlation, and reporting of identity credential lifecycle data. The Identity Analytics and Intelligence Engine may be implemented as a Software as a Service (SaaS) capability. The Identity Analytics and Intelligence Engine applies Semantic Web concepts/technologies and graph databases to automatically capture the identity credential lifecycle data along with the associated data exchanges within one or more Trust Frameworks.

20 Claims, 10 Drawing Sheets

(56) References Cited

U.S. PATENT DOCUMENTS

| | | | | |
|---|---|---|---|---|
| 2014/0279837 A1* | 9/2014 | Guo | ................ | G06F 17/30589 |
| | | | | 707/603 |
| 2016/0057592 A1* | 2/2016 | Tagg | ................ | H04W 84/042 |
| | | | | 455/414.1 |

* cited by examiner

CHARACTERIZING USER BEHAVIOR VIA INTELLIGENT IDENTITY ANALYTICS

CROSS REFERENCE TO RELATED APPLICATION

The present application claims the benefit of and priority, under 35 U.S.C. §119(e), to U.S. Provisional Application Ser. No. 61/985,955, filed Apr. 29, 2014, entitled "Characterizing User Behavior Via Intelligent Identity Analytics," the entire disclosure of which is hereby incorporated herein by reference, in its entirety, for all that it teaches and for all purposes.

BACKGROUND

Misuse of Information Technology (IT) identity credentials is a significant enabling factor for cyber-attacks. The resulting costs to a business to resolve these attacks can be very high. Some example business costs may include, but are not limited to, lost revenue, customer restitution, an extensive public relations campaign to repair public image (e.g., associated with the business and/or organization that suffered the attack, etc.), legal fees, regulatory fines, etc. Organizations are currently making large investments in cyber-attack protection products—yet the threat likelihood and associated costs with cyber-attacks continue to rise. Some examples of recent cyber-attacks where identity credentials were a key enabling factor are shown in Table 1 below.

Examples of recent cyber attacks where identity credential misuse was the key enabling factor were identified in a study outlined in the following table (Source: Verizon and Ponemon Institute, Cost of Cyber Crime Studies):

TABLE 1

| Organization | Type of Data Loss | Number of Records Breached | Key Enabling Factor | Example Costs to Organizations |
|---|---|---|---|---|
| Premera | Personally Identifiable Information (PII) and Protected Health Information (PHI) | 11M | Stolen Identity Credentials | Under Analysis - could exceed $50M |
| Anthem BC/BS | PII and PHI | 80M | Stolen Identity Credentials | Under Analysis - could exceed $100M |
| J P Morgan | Customer Personal Information | 75M | Stolen Identity Credentials | Data not released |
| eBay | PII and Credit Card | 145M | Stolen Identity Credentials | Large drop in revenues |
| University of Maryland | PII | 309K | Stolen Privileged Identity Credentials | $6M for free Credit Monitoring for 2 Years |
| Target | PII and Credit Card | 70M PII 40M Credit Card | Stolen Identity Credentials | 5.3% Revenue Loss |
| Experian Subsidiary | PII | 200M | Imposter Identity Credentials | Significant Public Relations Campaign |
| 42% of all Organizations | Intellectual Property, PII, Credit Card, and other types | Unknown but Considered Very Large | Insider Threat with Valid Identity Credentials | 65 days to Resolve $4.2M-$11.6M in Recovery Costs |

Current cyber-attack protection products provide reactive capabilities based on software behavior patterns (or signatures) of viruses and malware. Each of the organizations in Table 1 (above) had virus/malware protection products in-place. However, the organizations were still left unprotected against identity credential misuse.

The rapid transition by businesses to "Cloud Computing" and the advent of the "Internet of Things" (IoT) will make the problems and risks associated with identity credential misuse even worse. For example, Cloud Computing and the IoT can make identity credentials more highly distributed than they are today because most business utilize on-premises software capabilities for their Identity and Access Management functions that are limited to smaller scale networks and environments. However, Cloud Computing and the IoT operate over very large-scale, highly distributed networks. As a result, it is expected that the number of identity credentials in use at any given time will increase exponentially. This increase in identity credential usage can cause large amounts of data to go ignored due in part to the sheer magnitude of data available.

SUMMARY

It is with respect to the above issues and other problems that the embodiments presented herein were contemplated. In general, embodiments of the present disclosure provide methods, devices, and systems by which cyber-attacks may be rapidly detected and/or prevented. In some cases, these cyber-attacks may be enabled by either misuse of identity credentials and/or weaknesses within the identity credential lifecycle. In one embodiment, an Identity Analytics and Intelligence Engine is provided for the collection, exchange, analysis, correlation, and/or reporting of identity credential lifecycle data.

In some embodiments, the Identity Analytics and Intelligence Engine may provide an automated process implemented as a Software as a Service (SaaS) capability. The Identity Analytics and Intelligence Engine can be based on a rigorous and formal canonical data model that captures the identity credential lifecycle data as well as the data interactions within a large-scale, distributed Trust Framework. A Trust Framework may include a set of technical, operational, and legal (e.g., regulatory) requirements for identity credential data and data exchanges between one or more sets of agreeing parties. Among other things, the Trust Framework can establish a secure process with well-defined data exchanges between the agreeing parties that may be governed by a set of Trust Policies.

In one embodiment, the Identity Analytics and Intelligence Engine may apply Semantic Web concepts/technologies and/or graph databases to automatically capture the identity credential lifecycle data along with the associated data exchanges within one or more Trust Frameworks. Embodiments of this disclosure provide a Trust Framework based description of the aforementioned automated process. As provided herein, the disclosure describes data elements and associated data exchanges used in the characterization of user behavior via intelligent identity analytics. The data elements and data exchanges may be analyzed to create a Resource Description Framework (RDF) based graph data structure. By way of example, the RDF based graph data structure may be formally specified in a canonical data model using JavaScript Object Notation-Linked Data (JSON-LD) and implemented in a graph database. Data flow diagrams may be used to describe the data flow processes and interactions that occur within a Trust Framework. In some embodiments, the Identity Analytics and Intelligence Engine component architecture coupled with SaaS interfaces can generate an identity credential lifecycle knowledge base that may be used to derive use, or usage, and behavior patterns that can rapidly detect identity credential misuse. The intrinsic business and/or cyber-attack value of the Identity Analytics and Intelligence Engine to rapidly detect and protect against identity credential misuse is also described herein.

Embodiments of the present disclosure provide methods, devices, and systems by which identity credential misuse can be detected and/or proactively prevented through an automated process that continuously monitors and characterizes IT user behaviors.

Identity Analytics and Intelligence can include process of examining large amounts of network-based identity credential data to discover hidden patterns, unknown correlations, and other useful identity credential related behaviors. For example, Identity Analytics and Intelligence can incorporate "Something you Do" with one or more of the three other well-known identity credential factors. These identity credential factors may include "Something you Know" (e.g., a User Identification (UserID) and password, etc.), "Something you Have" (e.g., a secure card or token generator, etc.), and "Something you Are" (e.g., biometric information such as a fingerprint, iris scan, facial recognition, etc.). The Identity Analytics and Intelligence Engine may implement an automated process that continuously monitors and characterizes IT usage, or user behaviors, to rapidly detect and prevent identity credential misuse. In some embodiments, the Identity Analytics and Intelligence Engine may be embodied as a SaaS solution. This SaaS solution may be configured to provide a chronology of identity credential lifecycle events, tracks usage metrics, tracks IT user behavior patterns, and/or measure a variance between expected IT user behaviors and unexpected user behaviors, and the like.

As the number of identity credentials in use at any given time increases (e.g., exponentially, etc.) with the transition to Cloud Computing and the Internet of Things, large numbers of highly related IT user activities/behaviors associated with identity credentials may occur. To the casual observer, these IT user activities/behaviors may appear to be a large number of small, seemingly unrelated activities/behaviors occurring in a distributed manner Prior art solutions do not have any way to correlate and analyze this large number of highly distributed events. This lack of correlation and/or analysis leads to a set of serious challenges that must be addressed. Among other things, these challenges can include, but are not limited to, the following points:

Point 1—How to efficiently track and characterize user behavior over a large-scale network where a very large number of distributed identity credentials may exist. Of particular concern is the case where internal attacks will not be distinguishable from external attacks.

Point 2—How to rapidly identify inappropriate, unanticipated, non-compliant, and/or illegal IT user behavior. Early detection and automated process workflows that prevent these kinds of behavior from occurring may be essential, and the prior art software behavior/attack signature products are ineffective against these kinds of threats.

Point 3—How to specify public/private cloud-based Trust Frameworks and enforce them—identity credentials may become a composition of IT user attributes from multiple authoritative sources that can be difficult to trace. Additionally, it may be difficult to prove that the identity credential attributes are not fraudulent, incorrect, and/or inconsistent. Also, each IT user can have many different distributed identity credentials that are shared over the large, distributed network. In general, the differences/variances between these identity credentials can appear to very minor, but these differences/variances can result in major incongruities in authentication and authorization processes and practices.

Point 4—How the identity lifecycle management process needs to change and adapt to such a large number of highly distributed digital identity credentials.

Embodiments of the Identity Analytics and Intelligence Engine, as disclosed herein, can provide solutions to the points raised above.

Capability One—

A "Provenance Framework" may provide an identity credential lifecycle chronology of creation, ownership, data updates, usage, and/or patterns of behaviors. Such a framework can address the types of questions shown in the table below:

TABLE 2

| Question | Importance of Answer |
| --- | --- |
| Can I determine who an IT user is? | Provides the ability to detect the use of stolen or improperly acquired identity credentials as well as detecting if: 1) an imposter has improperly obtained identity credentials, 2) falsified identity credential attribute data is being provided, and/or 3) personal identity data obtained via Social Networking is being improperly used/exploited. |

TABLE 2-continued

| Question | Importance of Answer |
| --- | --- |
| Can I determine what access this IT user needs? | Provides the ability to detect insider threats and the inappropriate use of privileged, administrative access. |
| Can I determine what is normal behavior for this IT user? | Provides the ability to detect when an IT User is performing unanticipated behaviors that could indicate improper use of computing resources and/or a potential data loss. |
| Can I determine what is business appropriate behavior for this IT user? | Provides the ability to specify behavior baselines and benchmarks for a set of IT Users from which formal metrics can be established to measure the variance/deviation from normal behaviors. |

Capability Two—

An automated "Continuous Monitoring" process configured to rapidly harvest, exchange, analyze, correlate, and report on large amounts of highly distributed identity credential data. This capability may be used to create a global knowledge base that provides the following types of information through the application of search queries, data analytics, and machine learning algorithms.

TABLE 3

| Types of Knowledge Available | Importance of the Knowledge |
| --- | --- |
| Characterization of the IT User base | Establishes a baseline set of IT Users along with benchmarks for their usage and behavior patterns. |
| Perform segregation of IT User duties analysis | Establishes a baseline set of business appropriate behaviors for each class of IT User along with benchmarks for these behaviors. |
| Perform automated IT User account reviews | Establishes a methodology for determining if inappropriate identity credential data attributes or inappropriate identity credential data attribute updates are being made, and it serves as a way to ensure an IT User has not been over or under-privileged for their corresponding job duties. |
| Detect inappropriate use of administrative access | Allows for the rapid detection of external threats and especially insider threats that can cause large data loss events and/or large and widespread system outages. |
| Determine "toxic" combinations of access authorizations | Allows for the rapid detection of situations where an IT User can inadvertently cause harm because authentication and authorization inconsistencies have been created that can be inadvertently or explicitly exploited. |
| Facilitate and understand multi-factor identity credential access | Allows for full-spectrum consistency analysis to ensure multi-factor identity credentials are actually achieving increased Levels of Assurance. |

In some embodiments, the continuous monitoring methods and systems disclosed herein may be employed to address a number of challenges associated with the misuse of identity credentials. For example, the continuous monitoring methods and systems may address one or more of the challenges provided in the table below:

TABLE 4

| Challenges | Solution Method and/or System |
| --- | --- |
| Stolen Identity Credentials | Continuous monitoring of Usage/Behavior Patterns based on semantic web derived identity lifecycle relationships |
| Insider Threats with Valid Identity Credentials | Continuous monitoring of Usage/Behavior Metrics to Rapidly Detect variances from business appropriate behavior |
| Imposter Identity Credentials | Provenance Framework to continuously monitor identity credential attributes throughout the identity lifecycle |

TABLE 4-continued

| Challenges | Solution Method and/or System |
| --- | --- |
| Widespread Availability of Personal Information on the Internet and social media sites | Identity Proofing that leverages consumer information capabilities to generate Security Challenge Questions whose answer cannot be constructed from personal information available on the internet or social media sites. |
| Unintended Consequences of Aggregated Authorization Assertions | Logic-Based Analysis of Aggregated Authorization Tokens and Token Policies for Toxic Combinations |
| Is My Organization Missing Important Cues about Identity Credential Lifecycle Data | Integration of Machine Learning with Data Analytics over the data collected by multiple disparate products/capabilities to accurately predict the location of the "needle in the haystack" |

Embodiments include a method, comprising: detecting an identity credential associated with a user; establishing a baseline use behavior for the user and the identity credential; storing the baseline use behavior in a memory associated with the identity credential; monitoring a use behavior of the identity credential; determining whether a deviation exists between the use behavior and the baseline use behavior of the identity credential; and providing an output when the deviation is determined to exist, wherein the output is configured to address the deviation.

Embodiments include a method, comprising: collecting information associated with an identity credential associated with a user; and creating two or more distributed graph databases, wherein each graph database is configured to store identity credential lifecycle data associated with the identity credential. Aspects of the above method include receiving a query associated with the identity credential lifecycle data of the identity credential; arranging, in response to receiving the query, the identity credential lifecycle data in the two or more distributed graph databases for the identity credential into at least one data set having user behavior information; and summarizing the user behavior information of the at least one data set. Aspects of the above method include wherein summarizing the user behavior information of the at least one data set further comprises: applying at least one machine learning algorithm to the user behavior information of the at least one data set; and creating, in response to applying the at least one machine learning algorithm, a use pattern for the identity credential. Aspects of the above method include creating, in response to applying the at least one machine learning algorithm, a behavior pattern for the identity credential. Aspects of the above method include storing the use and behavior pattern for the identity credential in a memory associated with the identity credential. Aspects of the above method include receiving a subsequent query associated with the identity credential lifecycle data of the identity credential; arranging, in response to receiving the subsequent query, the identity credential lifecycle data in the two or more distributed graph databases for the identity credential into at least another data set having user behavior information; applying at least one machine learning algorithm to the user behavior information of the at least another data set; creating, in response to applying the at least one machine learning algorithm, a subsequent use and behavior pattern for the identity credential; and storing the use and behavior pattern for the identity credential in a memory associated with the identity credential. Aspects of the above method include wherein arranging the identity credential lifecycle data in the two or more distributed graph databases, further comprises: filtering the user behavior information in the two or more distributed graph databases for the identity credential. Aspects of the above method include wherein arranging the identity credential lifecycle data in the two or more distributed graph databases, further comprises: sorting the user behavior information in the two or more distributed graph databases for the identity credential.

Embodiments include a method, comprising: collecting identity lifecycle data associated with at least one identity credential, wherein the identity lifecycle data includes at least one use behavior associated with the at least one identity credential; determining an anticipated use behavior based on the collected at least one use behavior associated with the at least one identity credential; and measuring a variation between the anticipated use behavior and a detected unanticipated use behavior, wherein the detected unanticipated use behavior includes a use behavior of the at least one identity credential that is outside a threshold of the anticipated use behavior. Aspects of the above method include wherein the detected unanticipated use behavior includes at least one of a different subscriber authentication and different authorization property for the at least one identity credential than a subscriber authentication and authorization property associated with the anticipated use behavior. Aspects of the above method include wherein the detected unanticipated use behavior is used to at least one of enable and authorize additional controlled behaviors in the identity credential lifecycle data, wherein the additional controlled behaviors include a processing function unavailable to the anticipated use behavior. Aspects of the above method include wherein the received event information is compared in real-time. Aspects of the above method include wherein notifying the relying party includes rendering an alert image to a computer display operated by the relying party. Aspects of the above method include wherein the identity and intelligence engine automatically analyzes the canonical data in the graph databases using one or more machine learning algorithm.

Embodiments include a trust framework situated between a subscriber having an identity credential and a relying party that provides one or more computing resources to the subscriber based on identity authorization verifications received from the trust framework, the trust framework comprising: an identity and intelligence engine that automatically performs the following: (i) maintains a canonical data model for identity credential lifecycle data related to the subscriber; (ii) receives event information related to at least one of actions and inactions of the subscriber and catalogs the event information; (iii) compares the received event information with the canonical data model to determine whether or not the subscriber is acting in conformance with the canonical data model; and (iv) in the event that the subscriber is determined to be acting out of conformance with the canonical data model, notifies the relying party thereby enabling the relying party to deny or restrict the subscriber's access to the one or more computing resources. Aspects of the trust framework above include wherein the canonical data model is maintained with information obtained from a plurality of different data sources. Aspects of the trust framework above include wherein the identity and intelligence engine further creates a set of distributed graph databases that represent the canonical data model. Aspects of the trust framework above include wherein a predetermined deviation between the at least one of actions or inactions and the canonical data model is provided to allow the subscriber to still be in conformance with the canonical data model even when the at least one of actions or inactions to not exactly match the canonical data model. Aspects of the trust framework above include wherein the identity and intelligence engine continuously and automatically updates the canonical data model with the at least one of actions or inactions when the subscriber is determined to be in conformance with the canonical data model. Aspects of the trust framework above include wherein the identity credential lifecycle data includes data related to the creation, ownership, data update, usage, and patterns of behaviors associated with the identity credential.

Embodiments include a non-transitory computer readable medium having instructions stored thereon that, when executed by a processor, perform any of the methods above.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

"Computer-readable medium" as used herein refers to any tangible and non-transient storage and/or transmission medium that participate in providing instructions to a processor for execution. Such a medium may take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium excludes transient storage media, particularly electrical, magnetic, electromagnetic, optical, magneto-optical signals.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
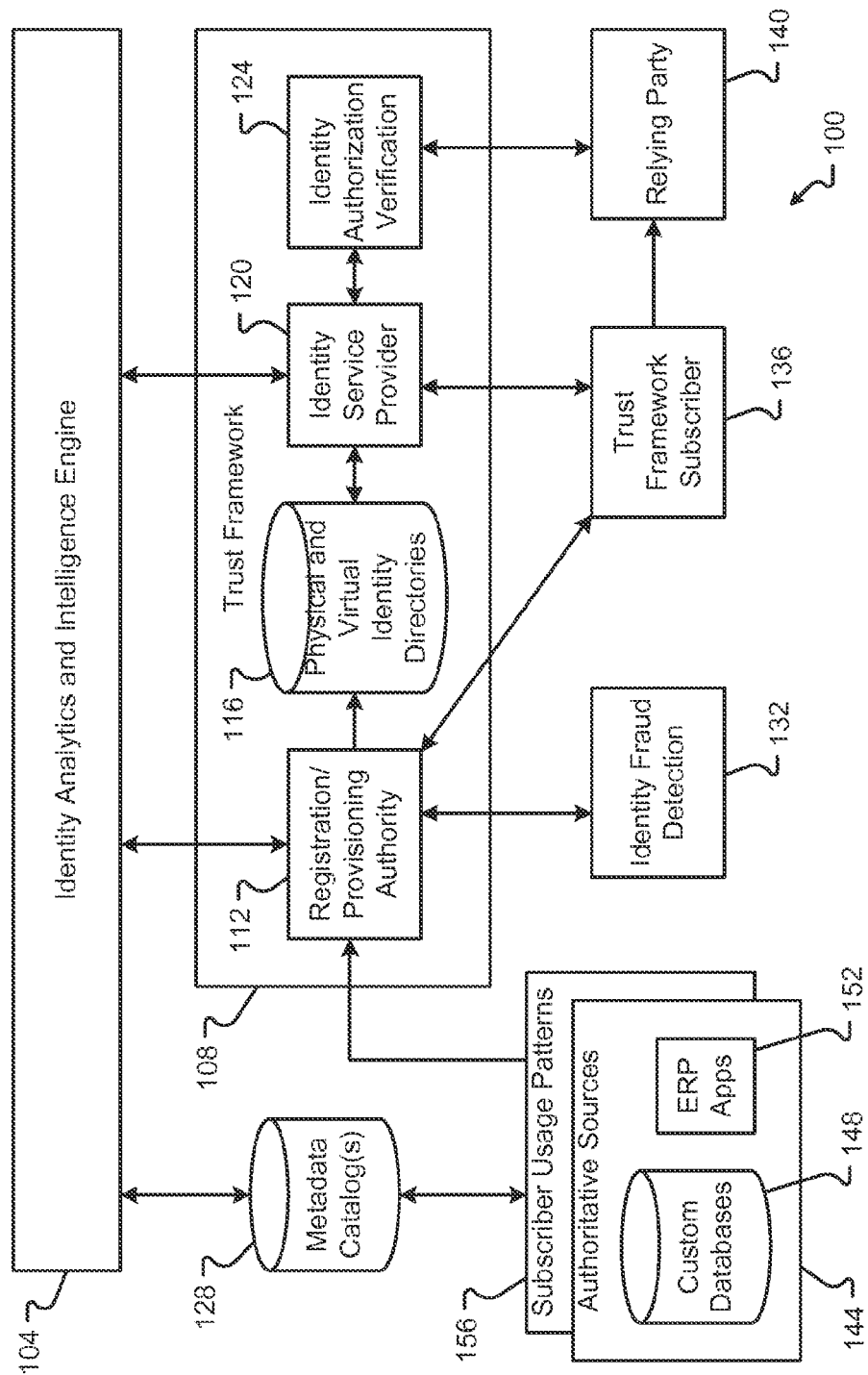
FIG. 1 is a block diagram of a security architecture and Identity Analytics and Intelligence Engine in accordance with embodiments of the present disclosure.

FIG. 1 shows the Identity Analytics and Intelligence Engine 104 in the context of a Trust Framework 108 and claims-based security architecture 100. The trust framework 108 can establish a secure process with well-defined data exchanges between the agreeing parties that may be governed by a set of trust policies. In some embodiments, the security architecture comprises a trust framework 108, a trust framework subscriber 136, a relying party 140, and an identity fraud detection component 132. The various components of the security architecture 100 are described in greater detail below.

The Trust Framework 108 may include the set of technical, operational, and legal (or regulatory) requirements that must be satisfied by one or more Trust Framework Subscribers 136 (e.g., IT Users, etc.), Identity Service Providers (ISP) 120, Relying Parties 140, and the Registration/Provisioning Authority 112. The Trust Framework 108 may also specify the required Level of Assurance that dictates the factors used in creating the identity credential data attributes and corresponding identity tokens.

The Trust Framework Subscriber 136 may request network and/or system access from the ISP 120. When a subscriber request is made, the ISP 120 can issue Authenticated Identity Tokens. In some embodiments, the authenticated identity tokens may contain the subscriber's 136 identity credential data attributes associated with their on-line identity.

The Relying Party 140 may accept Authenticated Identity Tokens from one or more Trust Framework Subscribers 136. The Relying Party 140 may then use the Identity Verification component 124 to verify the Authenticated Identity Token with the ISP 120. As a part of the identity verification process, the ISP 120 may provide the Identity Token Authorization Assertions to Relying Party 140 that allows it to determine what protected network and/or system resources the holder of the Authenticated Identity Token can access.

The Identity Fraud Detection component 132 may perform background and/or other checks on the identity data/attributes provided by the Subscriber 136 and Authoritative Sources 144. For example, the checks may be performed when a Subscriber 136 is performing a Registration Request with the Trust Framework 108.

Among other things, FIG. 1 provides an operational architecture view of the Identity Analytics and Intelligence Engine 104. Additionally or alternatively, FIG. 1 can be described in accordance with one or more of the following operational scenarios.

Scenario 1:

The Identity Analytics and Intelligence Engine 104 may be used to support the Registration/Provisioning Authority function of the Trust Framework 108. The Registration/Provisioning Authority 112 allows Trust Framework Subscribers 136 to register for network and/or system access. As Trust Framework Subscribers 136 attempt to register within the Registration/Provisioning Authority 112, the Identity Analytics and Intelligence Engine 104 can be used to search the Authoritative Identity Data Sources 144 to verify that the required identity credential attribute data exists. Additionally or alternatively, the identity credential attribute data may be supplied to an Identity Fraud Detection capability 132. This Identity Fraud Detection capability 132 may be a cloud-based service (e.g., IDology, Socure, etc.). In any event, the Identity Fraud Detection capability 132 may be configured to perform appropriate background checks and/or verify that no negative indicators or fraudulent identity data attributes are being used with respect to the trustworthiness of the subscriber 136.

If the Identity Fraud Detection capability 132 returns validated, positive identity credential data attributes, then the identity credential data attributes can be automatically provisioned into physical and/or virtual identity directories. Additionally or alternatively, the metadata for the subscriber's identity credential data and corresponding identity token is registered and used for future reference with respect to seeding the machine learning capability to begin creating usage and behavior patterns that characterize the subscriber's 136 system and/or network behavior.

Scenario 2:

Every time a subscriber 136 requests access, for example to at least one system resource, the ISP 120 can interface with the Identity Analytics and Intelligence Engine 104 to log the event and generate the metadata associated with the Authenticated Identity Token provided by the ISP 120 to the subscriber 136.

Scenario 3:

The Identity Analytics and Intelligence Engine 104 can interface with the Identity Verification Capability 124 which may be used by the Relying Parties 140 via the ISP 120. When the subscriber sends an Authenticated Identity Token to a Relying Party 140, the Trust Framework 108 and Relying Party 140 can use the Identity Analytics and Intelligence Engine 104 to log the reception of the Authenticated Identity Token and the metadata for the event may be generated. In some embodiments, the Relying Party 140 must receive the Identity Token Authorization Assertions to complete the authentication and authorization process. The Identity Verification Capability 124 receives the Identity Token Authorization Assertions from the ISP 120 and provides it to the Relying Party 140. During this exchange, the ISP 120 can interface with the Identity Analytics and Intelligence Engine 104 to log the reception of the authorization assertions, verify the identity token authorization assertions against the normal secure usage and behavior patterns for this identity credential, and even generate the required metadata. As the Relying Party 140 performs and logs network and/or system accesses (e.g., service request-responses, etc.) performed on behalf of this trust framework subscriber identity credential, the Identity Analytics and Intelligence Engine 104 securely scrapes, indexes, and processes best practice network and/or system resource (e.g., application, database, and/or server, etc.) log files maintained by the Relying Parties 140 to obtain relevant Security Information and Event Management (STEM) data. These best practice log files may contain identity credential information that can be used to correlate the authentication and authorization events with actual network and/or system resource usage by the subscriber 136 holding the identity credentials. As a part of this process flow, the Identity Analytics and Intelligence Engine 104 can also use its data analytics and machine learning capabilities to establish usage and behavior patterns for the subscriber identity credentials. As a result, when unanticipated subscriber behavior is recognized, the behavior can be automatically flagged and/or reported to a cybersecurity situational awareness and/or reporting tool(s) along with any recommended corrective actions.

The following disclosure provides several example use cases for the Identity Analytics and Intelligence Engine 104 in accordance with the operational scenarios described above.

Detection of a Subscriber that is an Insider Threat:

The Trust Policies within a Trust Framework 108 may define the security context and boundaries for a subscriber's 136 access. Additionally, the Authenticated Identity Token and Identity Token Authorization Assertions in conjunction with the Trust Policies may define which Relying Parties 140 a subscriber 136 is allowed to access along with the Relying Party 140 resources the subscriber 136 is authorized to access. Furthermore, the combination of the token, assertions, and policies may define the basis for a subscriber's 136 usage and behavior patterns. A subscriber 136 that attempts to operate outside of the subscriber's 136 basis, or baseline, usage and behavior patterns can be flagged for unanticipated behaviors that are determined to deviate from the basis usage and behavior patterns. For example, the subscriber 136 may be displaying unanticipated usages or behaviors that are typically not associated with the Authenticated Identity Token, the associated Authorization Assertions, and/or the Trust Policies.

Detection of a Subscriber's Stolen Authenticated Identity Token:

This use case is similar to the Insider Threat Use Case described above, but not necessarily be exactly the same. By way of example, a subscriber 136 that is an insider threat may obey the rules of the basis usage and behavior patterns, but the subscriber that is an insider threat may also attempt to violate those rules with unanticipated behaviors that can represent a security threat. However, an individual using a stolen Authenticated Identity Token has a very low probability of obeying the rules of the basis usage and behavior patterns because the individual would not necessarily have this information available. As can be appreciated, almost all of the behaviors associated with a stolen Authenticated Identity Token will be unanticipated and represent a security threat.

Detection of a Loss of Trust for a Relying Party (e.g., the Relying Party has been Compromised):

This use case represents when a Relying Party 140 has been compromised or has chosen to violate the rules of the Trust Framework 108. This violation may provide Relying Party 140 behaviors that are inconsistent with the basis usage and behavior patterns established by the Trust Policies and the subscriber's 136 Authenticated Identity Token and Identity Token Authorization Assertions. For example, the Relying Party 140 behavior may ignore the Identity Token Authorization Assertions and complete subscriber request-response access requests to resources the subscriber 136 should not have access to. This use may represent unanticipated behavior by the subscriber that is most likely a security threat.

Detection of a Subscriber that is Over Privileged:

This use case represents when a subscriber 136 has authorization privileges beyond those anticipated for the subscriber's 136 class of Authenticated Identity Token. For example, the subscriber 136 may have access to Relying Party 140 resources that are inconsistent with the normal types of access requests made by others with the same job function.

Detection of a Subscriber that is Overtly Changing their Behavior in Order to Probe for Security Holes and/or Gain Additional Access:

This use case is similar to the Insider Threat Use Case with the exception that the subscriber 136 may be attempting to probe for holes in the Trust Policies. For example, the subscriber 136 may makes subtle changes to their behavior that does not necessarily represent unanticipated behavior at a particular point in time. However, when this behavior is examined over an extended period of time, a pattern of unanticipated behaviors can be discovered that represents subtle attempts to probe for holes in the Trust Policies.

Detection of Trust Policies that are Too Restrictive or Too Relaxed:

For this use case a subscriber 136 is unintentionally being denied a valid access request or is unintentionally being granted a non-valid access request for the subscriber's 136 class of Authenticated Identity Token and Identity Token Authorization Assertions. This use case may represent a problem with the way one or more Trust Policies have been defined and are being enforced. Additionally or alternatively, this use case may represent a problem with the way the Authenticated Identity Token and corresponding Identity Token Authorization Assertions have been defined.

Classification of Subscriber Behavior with Respect to the Services Provided by the Relying Parties:

For this use case, the intent may include characterizing overall subscriber 136 population behaviors rather than only characterizing an individual subscriber's 136 behavior. These more global identity analytics provide detailed insight into subscriber 136 trends with respect to web sites, applications, services, and data sources. Additionally, these subscriber 136 patterns provide insight into the relationships between subscriber identity credentials and usage/behavior patterns, identity credential data attributes/factors, and access privileges.

FIGS. 2-6 show various process data flow diagrams associated with the operational scenarios provided above. As shown in FIGS. 2-6, data flows may be represented by specific labeled arrows between elements of the system. As illustrated in each of the data flow diagrams, large amounts of highly distributed information may need to be harvested, collected, exchanged, analyzed, and correlated in order to form a global knowledge base that captures an identity credential lifecycle.

Figure 2:
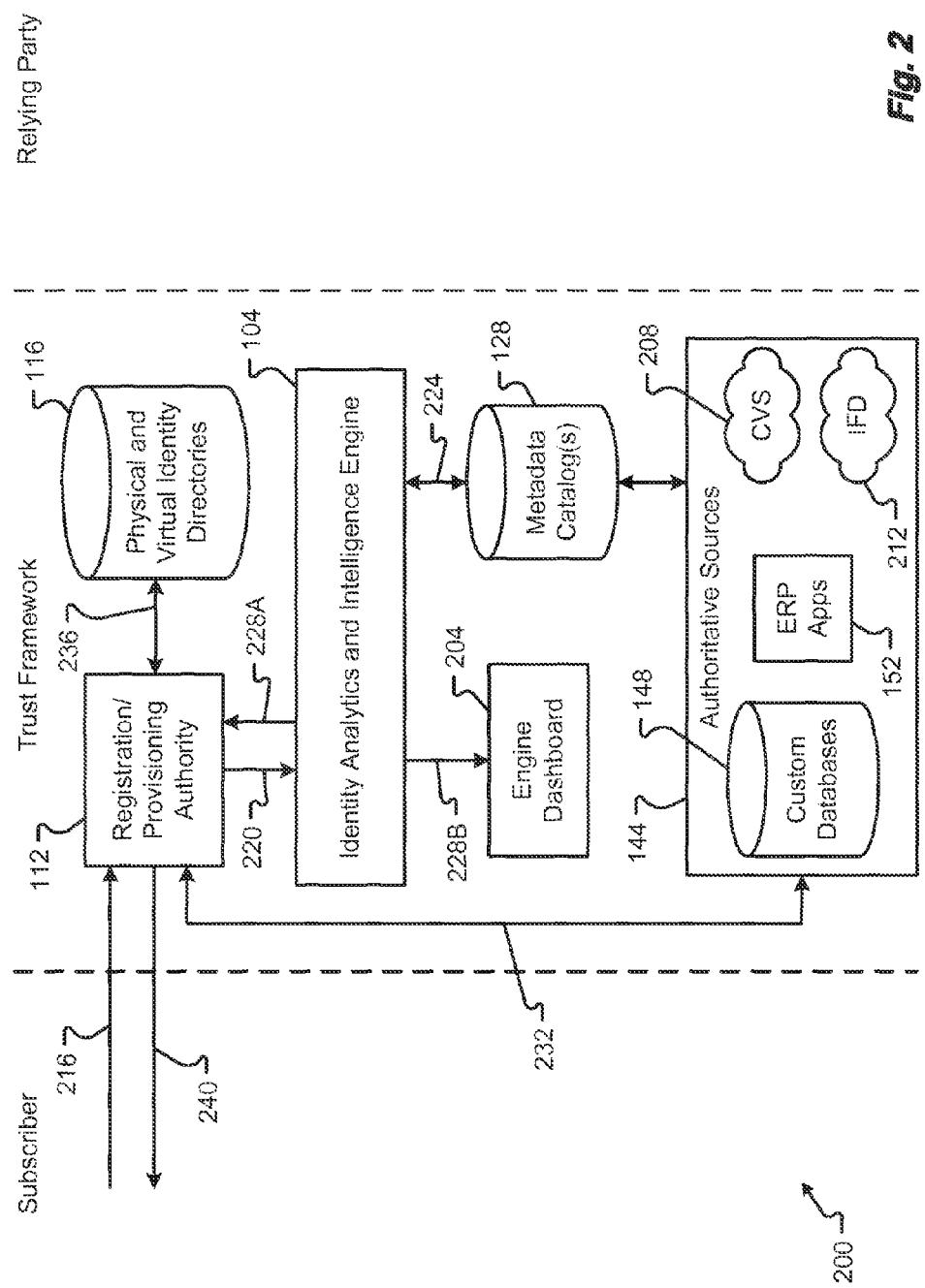
FIG. 2 shows a process data flow for register and provisioning a new subscriber in accordance with embodiments of the present disclosure.

Referring now to FIG. 2, the process data flow diagram 200 associated with a Subscriber 136 registering with the Trust Framework 108 is shown in accordance with embodiments of the present disclosure.

The data flow diagram 200 shows a Trust Framework Subscriber 136 sending identity data 216 to the Registration/Provisioning Authority 112 to request membership. Using the identity data 216, the Registration/Provisioning Authority 112 makes a request 220 to the Identity Analytics and Intelligence Engine 104 to verify the Subscriber's 136 Identity Credential Information. In response to receiving the request 220, the Identity Analytics and Intelligence Engine 104 queries 224 the Authoritative Identity Data Sources 144 having cloud-hosted identity fraud capabilities. In some embodiments, the cloud-hosted identity fraud capabilities may be provisioned by one or more Cloud Vendor Sources (CVS) 208. Examples of CVS 208 companies include, but are in no way limited to, IDology, Socure, etc. Among other things, the query 224 may be made to determine the validity of the request 220. In one embodiment, the data flow may continue by determining whether to complete the registration, for example, where sufficient identity data exists. Sufficient identity data may be based on one or more of the identity credential factors previously described. Identity credential factors may include "Something you Know," "Something you Have," and/or "Something you Are," to name a few.

In the event that the registration request is valid and sufficient identity credential data exists, then the valid verification results 228A are returned to the Registration/Provisioning Authority 112. However, in the event that the registration request is not valid and sufficient identity credential data does not exist, then an invalid registration request may be sent as the verification results 228A. In some embodiments, the identity data retrieved by the Identity Analytics and Intelligence Engine 104 may be formatted and returned to the Registration/Provisioning Authority 112 to provision the Subscriber identity data in the Physical and Virtual Identity Directories 116. In some embodiments, the verification results 228B may be sent to the Engine Dashboard 204 for review and/or action. The verification results 228B may be sent to the Engine Dashboard 204 in cases where the registration request is found to be valid or invalid.

Next, the Registration/Provisioning Authority 112 retrieves the required identity credential data 232 for a valid registration request from the authoritative sources 144. In some embodiments, the Identity Analytics and Intelligence Engine 104 may retrieve this required identity credential data 232 as part of providing the verification results 228A as described above. In any event, the Registration/Provisioning Authority 112 then may automatically provision the Subscriber identity credential data 236 in the Physical and Virtual Identity Directories 116. The data flow may end by sending a registration confirmation notice 240 to the Subscriber 136.

Figure 3:
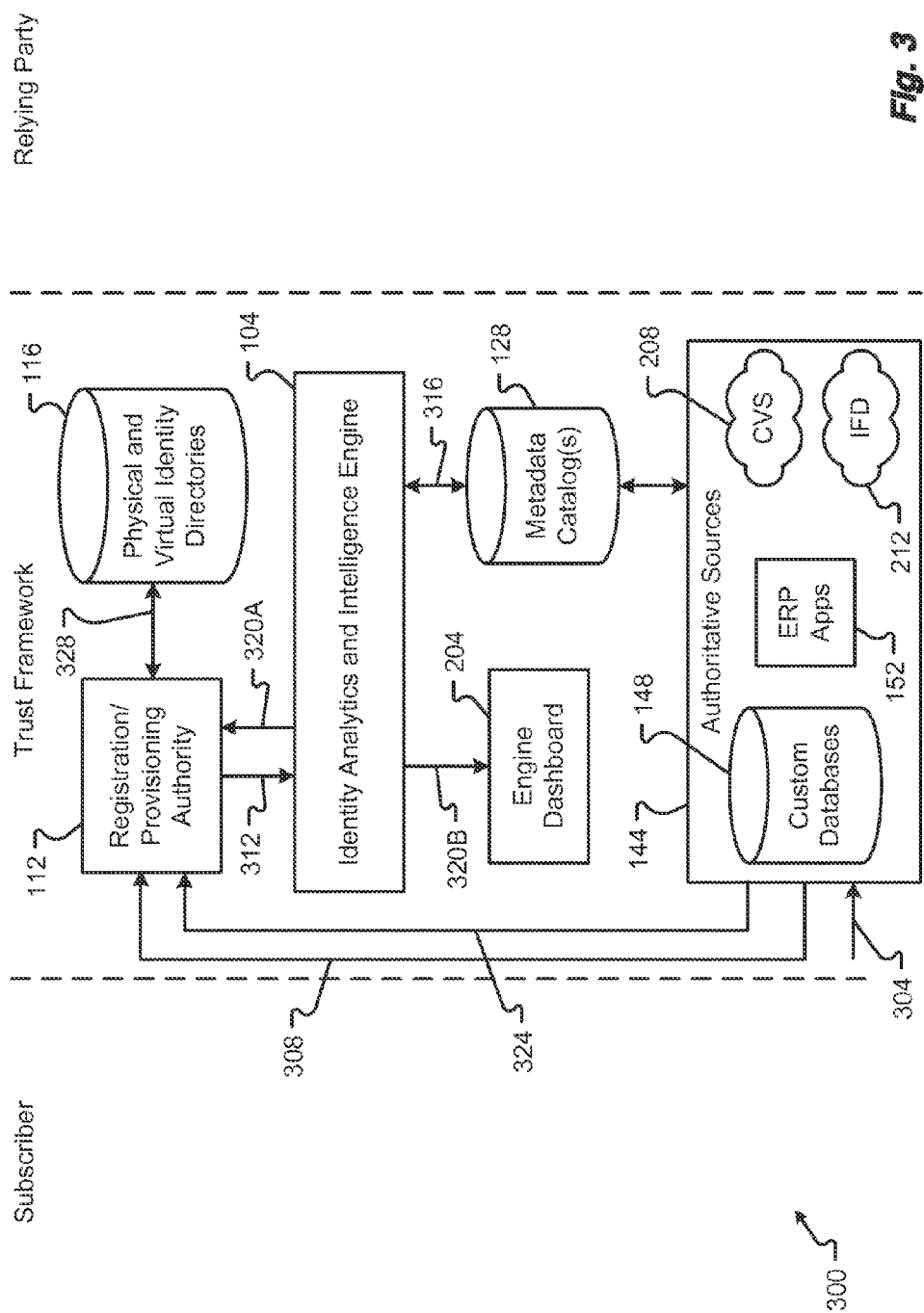
FIG. 3 shows a process data flow for re-provisioning an existing subscriber in accordance with embodiments of the present disclosure.

FIG. 3 describes the process data flow 300 associated with an Administrator making a data change to one or more of the Authoritative Identity Data Sources that creates the need to re-provision an existing Subscriber 136.

In FIG. 3 a Trust Framework Administrator may make a change 304 to the Subscriber identity credential data stored in the Authoritative Identity Data Sources 144. In response to the change 304, a Subscriber Data Change Event 308 may be sent to the Registration/Provisioning Authority 112 to re-verify the Subscriber identity credentials and re-provision the Subscriber identity credential data in the Physical and Virtual Identity Directories 116. In one embodiment, the Registration/Provisioning Authority 112 makes a request 312 to the Identity Analytics and Intelligence Engine 104 to re-verify the Subscribers Identity Credential Information. The Identity Analytics and Intelligence Engine 104 may then query 316 the Authoritative Identity Data Sources 144 and interfaces with cloud-hosted identity fraud capabilities to re-verify the Subscriber identity credential data. In some embodiments, the cloud-hosted identity fraud capabilities may be provisioned by one or more Cloud Vendor Sources (CVS) 208. Examples of CVS 208 companies include, but are in no way limited to, IDology, Socure, etc. If the identity credential data change event is valid and sufficient identity credential data exists, then the valid verification results 320A may be returned to the Registration/Provisioning Authority 112. Otherwise, an invalid data change event has occurred and is sent as the verification results 320A. In one embodiment, and as part of this data flow step, the identity credential data retrieved by the Identity Analytics and Intelligence Engine 104 may be formatted and returned to the Registration/Provisioning Authority 112 to provision the Subscriber identity credential data in the Physical and Virtual Identity Directories 116.

Regardless of whether the registration event is valid or invalid, the verification results 320B may be sent to the Engine Dashboard 204 for review and/or action. Next, the Registration/Provisioning Authority 112 retrieves the required identity credential data 232 for the identity credential data change event from the authoritative sources 144. In some embodiments, the Identity Analytics and Intelligence Engine 104 may retrieve this required identity credential data 232 as part of providing the verification results 320A as described above. In any event, the Registration/Provisioning Authority 112 then may automatically re-provision the Subscriber identity credential data 236 in the Physical and Virtual Identity Directories 116.

Figure 4:
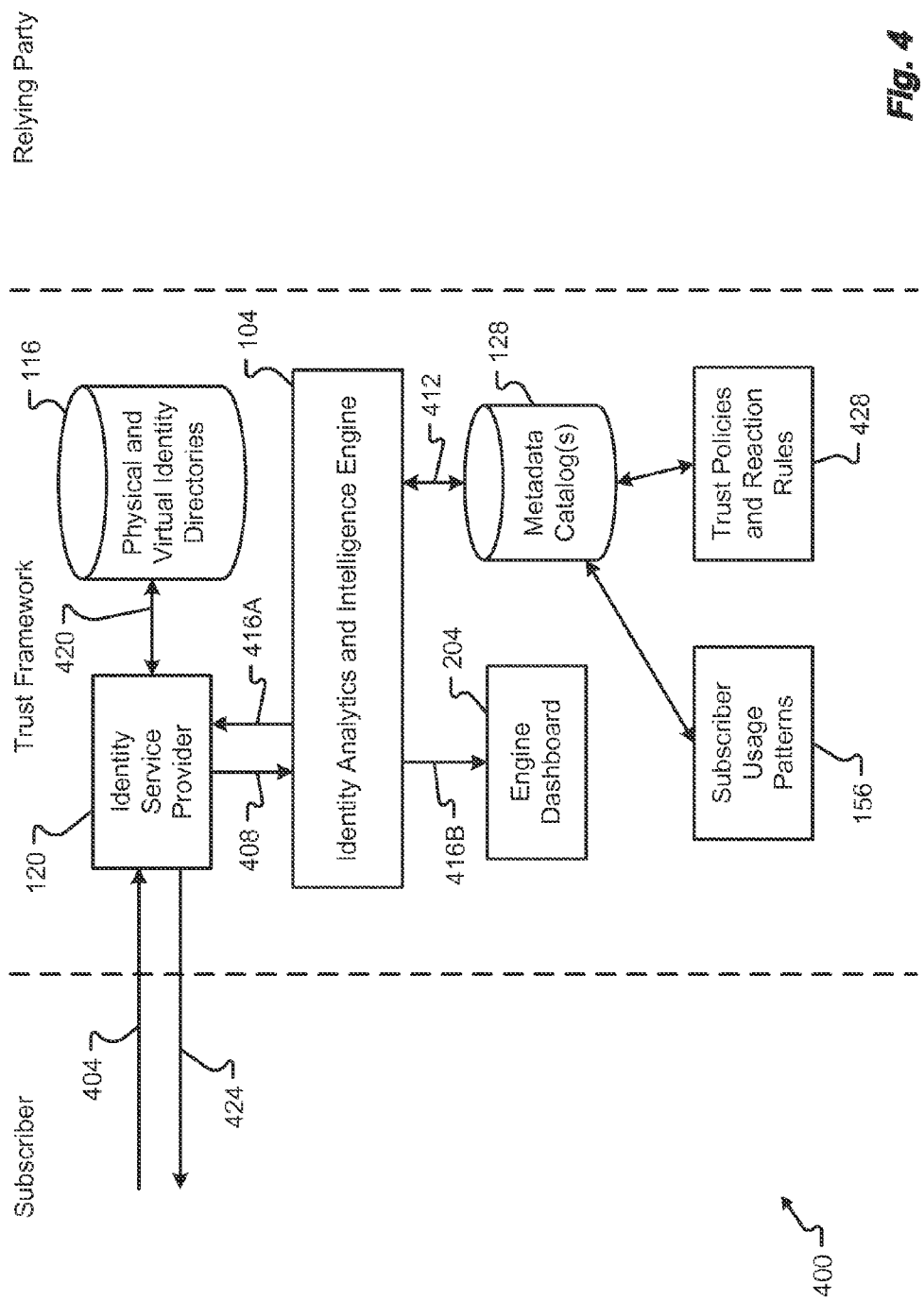
FIG. 4 shows a process data flow for a subscriber access request in accordance with embodiments of the present disclosure.

FIG. 4 describes the process data flows associated with a Subscriber 136 making a request to the Trust Framework 108 for an Authenticated Identity Token that will allow access the protected resources of a Relying Party 140.

The data flow diagram 400 shows a Trust Framework Subscriber 136 requesting access 404 to a Relying Party 140 via the ISP 120. The ISP 120 then makes a request 408 to the Identity Analytics and Intelligence Engine 108 to analyze the Subscriber's access request. In response, the Identity Analytics and Intelligence Engine 108 queries 412 the Subscriber Usage Patterns 156 to determine the Subscriber's 136 behavior patterns. In some embodiments, the Identity Analytics and Intelligence Engine 104 may additionally query the Trust Policies and Reaction Rules 428 to determine if the Subscriber's access request is within stated Trust Policies. This information may be analyzed by the Identity Analytics and Intelligence Engine 104 to verify that the request is valid.

If the access request is valid, the Identity Analytics and Intelligence Engine 104 can return the valid access request analysis results 416A to the ISP 120. Otherwise, an invalid access request has occurred and the invalid access request analysis results may be sent as the verification results 416A. Regardless of whether the access request is determined to be valid or invalid, the access request analysis results 416B can sent to the Engine Dashboard 204 for review and/or action.

Next, the ISP 120 may retrieve 420 the Subscriber's Identity Token data from the Physical and Virtual Identity Directories 116. The ISP then sends the Subscriber 136 an Authenticated Identity Token to access the Relying Party 140.

Figure 5:
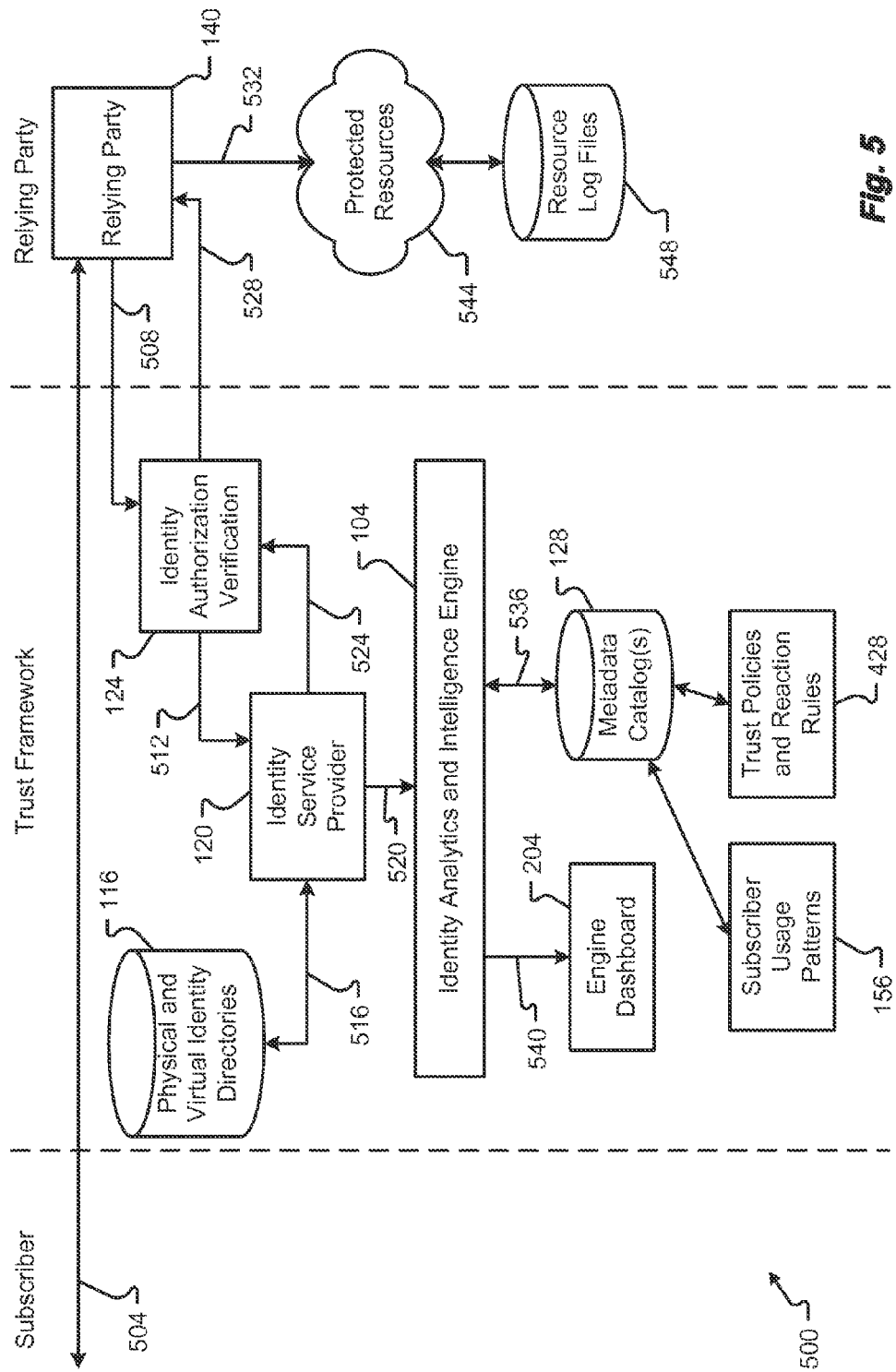
FIG. 5 shows a process data flow for logging and analyzing subscriber access request to a relying party in accordance with embodiments of the present disclosure.

FIG. 5 describes the process data flows associated with a Subscriber 136 requesting access to the protected resources 544 of a Relying Party 140 by sending the Relying Party 140 an Authenticated Identity Token and the resulting logging of passing the Identity Token Authorization Assertions to the Relying Party 140.

The data flow diagram 500 begins when a Trust Framework Subscriber 136 requests access to a Relying Party 140 by sending them an Authenticated Identity Token 504. The Relying Party 140 may then send 508 the Authenticated Identity Token to the Identity Authorization Verification capability 124. In response, the Identity Authorization Verification capability 124 sends an authorization request 512 to the ISP 120. The ISP 120 can then retrieve 516 the Subscriber's Identity Token Authorization Assertions from the Physical and Virtual Identity Directories 116. Next, the ISP 120 sends 520 a Log Authorization Request to the Identity Analytics and Intelligence Engine 104. The ISP 120 returns 524 the Identity Token Authorization Assertions to the Identity Authorization Verification capability 124. In response, the Identity Authorization Verification capability 124 verifies the authorization assertions and returns 528 them to the Relying Party 140. The Relying Party 140 then passes the Authenticated and Authorized Service Invocation request to the appropriate protected resources 544 for execution and return of the service response to the Subscriber 136. The Identity Analytics and Intelligence Engine 104 may query 536 the Subscriber Usage Patterns 156 to determine the Subscriber's behavior patterns and query 536 the Trust Policies and Reaction Rules 428 to determine if the Subscriber's access request is within stated Trust Policies. The authorization request notification results may then be sent 540 to the Engine Dashboard 204 for review and/or action.

Figure 6:
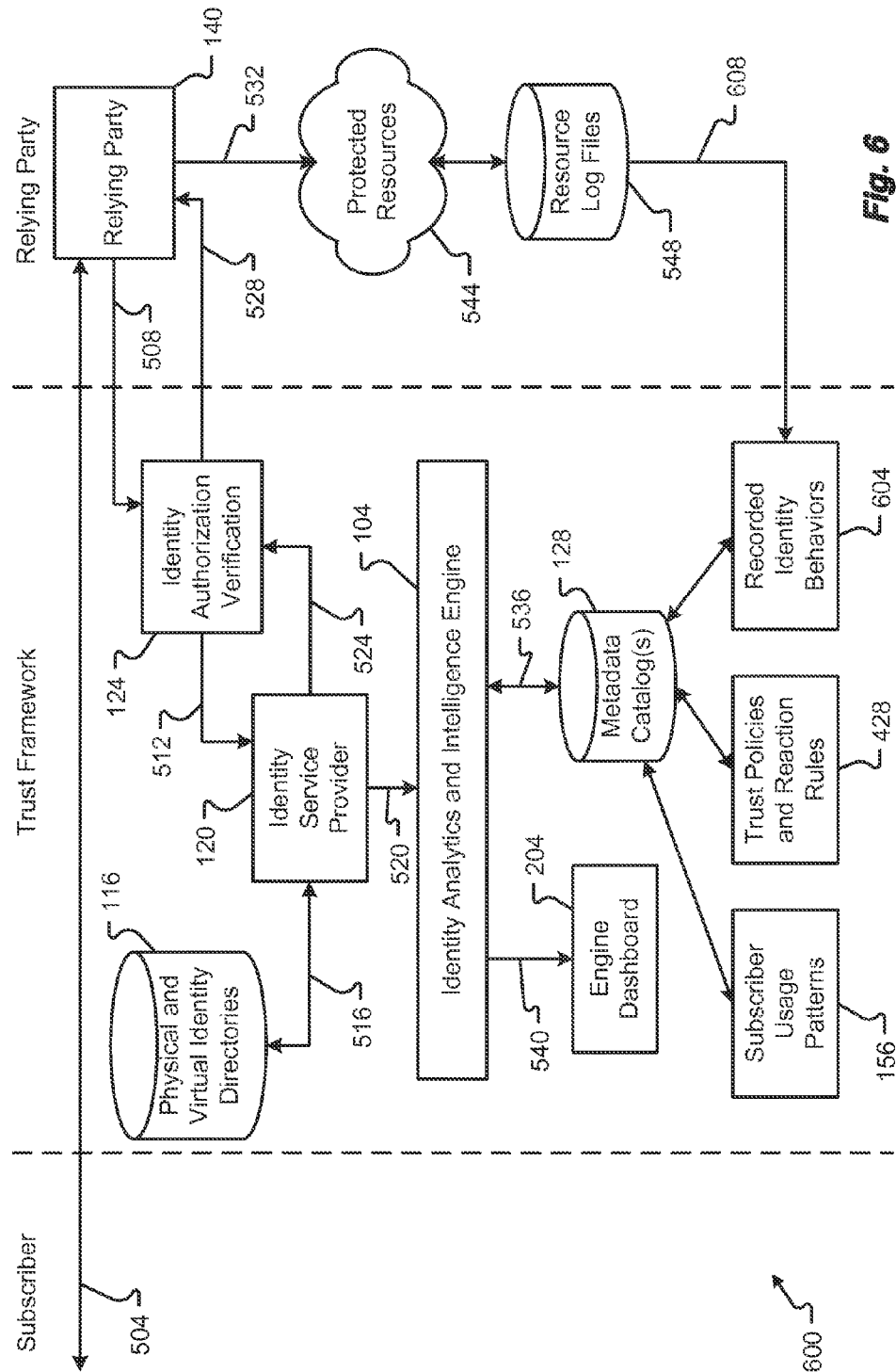
FIG. 6 shows a process data flow for continuously logging and analyzing relying party accesses in accordance with embodiments of the present disclosure.

FIG. 6 describes the process data flows associated with continuously logging Relying Party 140 accesses on behalf of the Subscriber 136. This scenario logs each of the Identity Token Authorization Assertions requests as well as logging the Subscribers behavior with respect to each of their accesses to the Relying Party protected resources 544.

The data flow diagram 600 begins when a Trust Framework Subscriber 136 requests access to a Relying Party 140 by sending them an Authenticated Identity Token 504. The Relying Party 140 may then send 508 the Authenticated Identity Token to the Identity Authorization Verification capability 124. In response, the Identity Authorization Verification capability 124 sends an authorization request 512 to the ISP 120. The ISP 120 can then retrieve 516 the Subscriber's Identity Token Authorization Assertions from the Physical and Virtual Identity Directories 116. Next, the ISP 120 sends 520 a Log Authorization Request to the Identity Analytics and Intelligence Engine 104. The ISP 120 returns 524 the Identity Token Authorization Assertions to the Identity Authorization Verification capability 124. In response, the Identity Authorization Verification capability 124 verifies the authorization assertions and returns 528 them to the Relying Party 140. The Relying Party 140 then passes the Authenticated and Authorized Service Invocation request to the appropriate protected resources 544 for execution and return of the service response to the Subscriber 136.

In some embodiments, a continuous monitoring capability is described in the data flow diagram 600. For instance, the following steps may occur in parallel to perform a continuous monitoring capability. A distributed collection process may be executed against the Relying Parties Resource Log Files 548 to continuously collect and record Subscriber behavior based on their identity credentials. The Identity Analytics and Intelligence Engine 104 may continuously: query 608 the Subscriber Usage Patterns 156 to determine the Subscriber's behavior patterns, query 608 the Trust Policies and Reaction Rules 428 to determine if the Subscriber's access request is within stated Trust Policies, and even query 608 the Recorded Identity Behaviors 604 associated with the Relying Party 140 to determine if the Subscriber's authorization request is consistent with previous requests. A continuous analysis process may be performed on the query results to update Subscriber Usage Patterns 156, Check Subscriber usage against the Trust Policies and Reaction Rules 428, and trigger any required threat indicators and/or reaction rules. The Identity Analytics and Intelligence Engine 104 may send Unanticipated Behavior Detected Notifications to the Engine Dashboard 204 for review and/or action. The Identity Analytics and Intelligence Engine may send routine and recurring Anticipated Behavior Notifications to the Engine Dashboard 204 for review and/or action.

Figure 7:
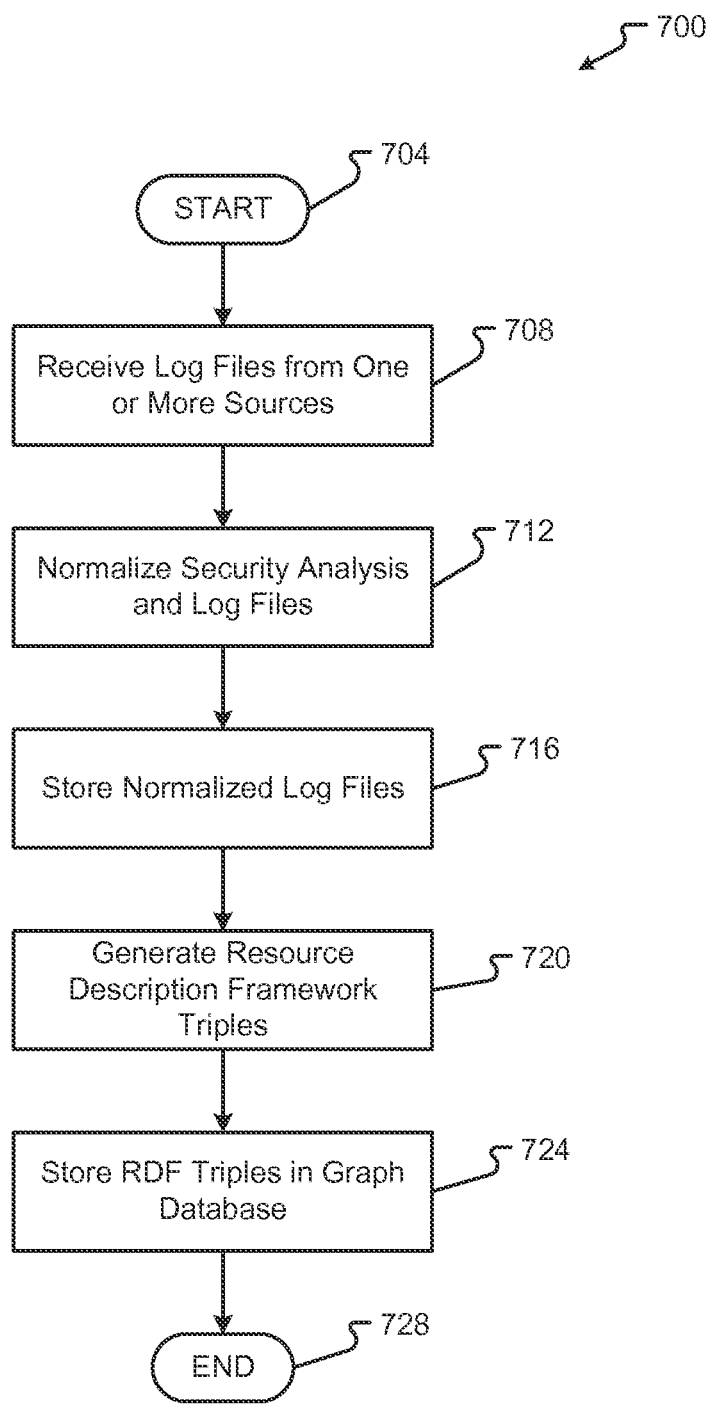
FIG. 7 is a flow or process diagram for normalizing log files in accordance with embodiments of the present disclosure.

An embodiment of a method 700 to analyze security and normalize log files is shown in FIG. 7. A general order for the steps of the method 700 is shown in FIG. 7. Generally, the method 700 starts with a start operation 704 and ends with an end operation 728. The method 700 can include more or fewer steps or can arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, software, data structures, user interfaces, databases, etc. described in conjunction with FIGS. 1-6.

The method 700 begins at step 704 and proceeds by receiving log files from one or more sources (step 708). In some embodiments, the log files may be provided by one or more security analysis tools and/or categories. Examples of these security analysis tool categories may include, but are in no way limited to, Network Traffic Inspectors, Identity and Access Management Products, System and/or Security Intelligence Products, Platform Analysis Products, and the like. The services falling under these categories may be provided by one or more vendors. Although these vendors may provide "point solutions" for specific types of security problems, these problems may be unrelated to identity credential misuse. Among other things, the security tools alone provided by the vendors do not address the challenges of credential misuse nor do they offer rapid detection capabilities. It is an aspect of the present disclosure to continuously monitor the information provided under one or more of the security analysis tool categories and integrate, as well as correlate, the large volumes of data. Additionally or alternatively, the embodiments disclosed herein provide continuous monitoring solutions that are able to correlate large amounts of small, distributed pieces of identity credential lifecycle data to discover hidden patterns and correlations. Additionally or alternatively, the Identity Analytics and Intelligence Engine 104 may be configured to receive server and/or application log files in step 708. Some examples of log files may include, but are not limited to, Log4j, Common Event Format (CEF), Syslog, and/or other vendor-specific formats.

Next, the method 700 may continue by normalizing the security analysis and log files (step 712). For example, using a Database of Conversion Rules, a Log File Normalization component may convert the log file data into a normalized form. This normalized form can expedite the process of creating Resource Description Framework (RDF) triples. In any event, the normalized log files may be stored to a memory in step 716.

The method 700 proceeds by generating RDF triples from the normalized log files (step 720). Among other things, the RDF triples can provide semantic web properties. In some embodiments, RDF triples may be represented as a triple consisting of <subject, predicate, object>. RDF triples may be used to make statements about resources, for example, in particular web resources. The subject may denote the resource; the predicate may denote traits, or properties, of the resource and can also express a relationship between the subject and the object. The object may denote another resource or a value. In some embodiments, the Database of Conversion Rules can be used to transform the contents of the normalized log files into RDF triples. The generated RDF triples may be stored in a graph database in step 724. The method 700 may end at step 728.

One example log file content to RDF triple conversion rule is illustrated in the following table:

TABLE 5

| Log File Content | Corresponding RDF Triple Element |
|---|---|
| User Name (A Subscriber) | Subject |
| Source IP Address | Attribute of Subject |
| Partner ID Code | Attribute of Subject |
| Event (Request for Service) | Predicate |
| Transaction Request Time | Attribute of Predicate |
| Security Token Protocol | Attribute of Predicate |
| Host Server Name | Attribute of Predicate |
| Server Role | Attribute of Predicate |
| Target Application URL (Relying Party) | Object |
| Time to Process Request | Attribute of Object |
| Result Status Code | Attribute of Object |
| Error Code Description | Attribute of Object |

Figure 8:
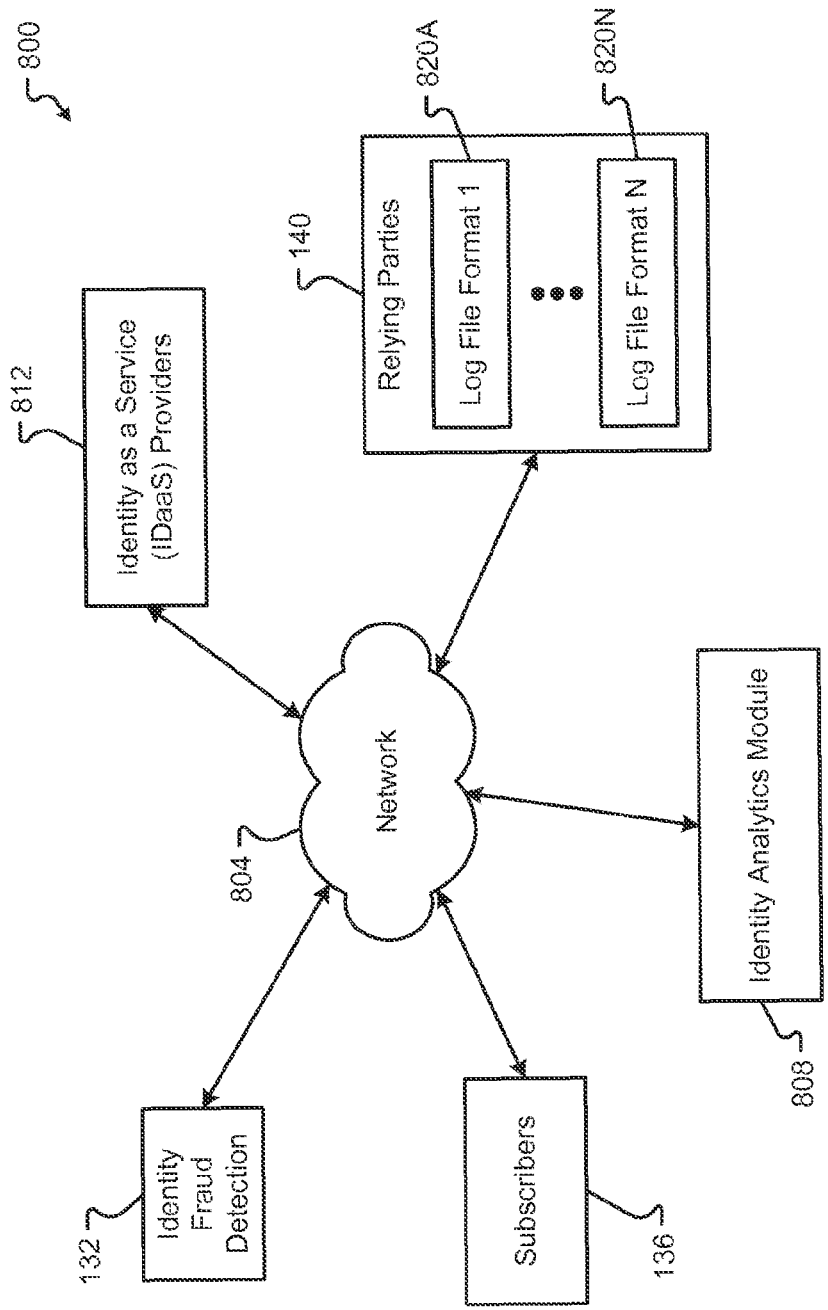
FIG. 8 shows a block diagram of a distributed identity credential lifecycle data collection process in accordance with embodiments of the present disclosure.

FIG. 8 shows an operational network 800 ecosystem view of the data interactions within a trust framework 108 in accordance with embodiments of the present disclosure. In some embodiments, the Identity Analytics and Intelligence Engine 104 automated process may be implemented as a set of cloud-hosted, SaaS interfaces. FIG. 8 illustrates how the SaaS interfaces may be used to automatically collect highly distributed identity credential lifecycle data. The collected data may then be stored within the graph database of the Identity Analytics and Intelligence Engine 104 of the Identity Analytics Module 808 for further analysis by data analytics and machine learning algorithms. The Identity Analytics Module 808 can include one or more of metadata models or catalogs 128, machine learning algorithms, graph databases, trust policies, usage patterns, dashboard and reporting elements, and the like.

A canonical data model with metadata (e.g., stored in one or more of the metadata catalogs 128 or other memory of the Identity Analytics Module 808) has been created. The canonical data model can provide a standardized definition of the nodes and edges contained within the graph database. The standardized definitions allow for the easy creation of public interfaces that allow for many different types of publishers and consumers to utilize the collected identity lifecycle data. The metadata provides the semantic definitions of the identity credential lifecycle data, and the metadata allows for the graph database contents to be visible, understandable, and accessible for a wide variety of users via data publishing and searching techniques.

For example, the metadata can allow for rapid searching and search results collection for analysis and correlation by data analytics and machine learning algorithms. The data analytics and machine learning algorithms are used to create the subscriber usage and behavior patterns. As real-time data flow exchanges are occurring, the Identity Analytics and Intelligence Engine 104 of the Identity Analytics Module 808 compares the real-time subscriber behavior to their historical usage and behavior patterns to determine if inappropriate, unanticipated, non-compliant, and/or illegal subscriber behavior is occurring. The term "real-time" as used herein may correspond to the time during which a process and/or event occurs. In some embodiments, performing an action "in real-time" may include the time during which a process and/or event occurs and adding any other time associated with processing, sending data, receiving data, and/or translating data required in performing the action.

FIG. 8 may also be used to illustrate the types of identity credential data being exchanged in a Cloud Computing and Internet of Things environment. For example, information provided by Subscribers 136 to the Network Topology 800 can include one or more of registration requests, authenticated token requests, relying party requests, and the like. This information illustrates the types of data flow information the Identity Analytics and Intelligence Engine 104 can automatically and continuously collect from all elements of the Trust Framework 108.

Each element in the network topology 800 may include various SaaS interfaces that provide for the exchange of information between the elements across a network 804. In accordance with at least some embodiments of the present disclosure, the network 804 may comprise any type of known communication medium or collection of communication media and may use any type of protocols to transport messages between endpoints. The network 804 may include wired and/or wireless communication technologies. The Internet is an example of the network 804 that constitutes an Internet Protocol (IP) network consisting of many computers, computing networks, and other communication devices located all over the world, which are connected through many telephone systems and other means. Other examples of the network 804 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a cellular network, and any other type of packet-switched or circuit-switched network known in the art. In addition, it can be appreciated that the network 804 need not be limited to any one network type, and instead may be comprised of a number of different networks and/or network types. Moreover, the network 804 may comprise a number of different communication media such as coaxial cable, copper cable/wire, fiber-optic cable, antennas for transmitting/receiving wireless messages, and combinations thereof. The network 804 may provide a variety of services, such as communication services, data exchange, notification services, and the like between the various components of the network topology 800.

The Relying Parties 140 element may include one or more SaaS interfaces and log file formats. The log files may be contained in a number of Security Information and Event Management (SIEM) formats 820A-N. The Relying Parties 140 may take receipt of Authenticated Tokens and Assertions, request to verify authorizations, store SIEM and/or other log files, combinations thereof, and/or the like.

In addition to including the SaaS interfaces, the Identity as a Service (IDaaS) Providers 812 component may include one or more of Authoritative Sources for Identity Attributes 144, Physical and Virtual Identity Directories 116, and ISP 120. The IDaaS Providers 812 can store and/or manage identity attributes, registration keys, tokens and assertions, access request logs, etc.

Figure 9:
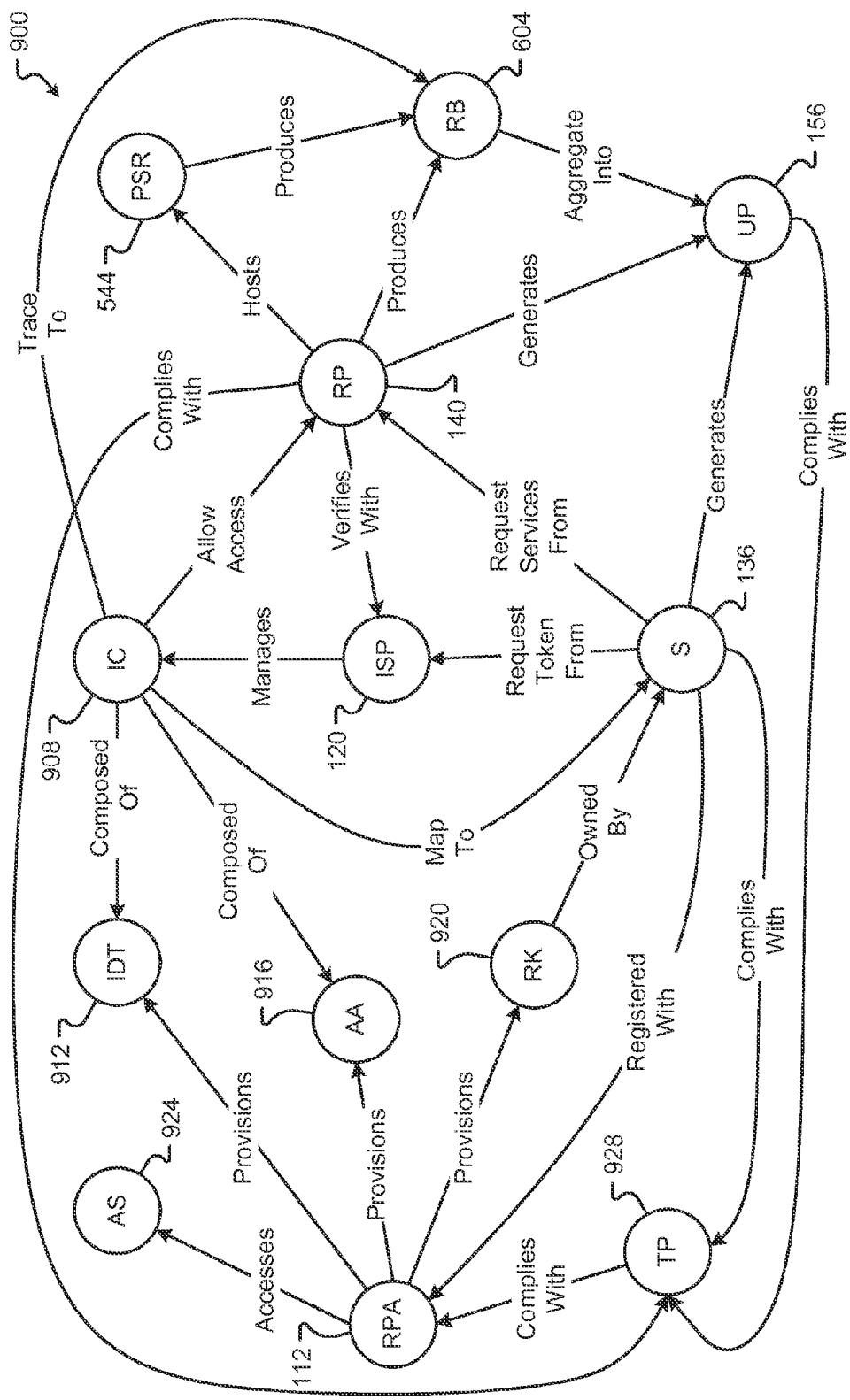
FIG. 9 shows a block diagram of a graph database design model in accordance with embodiments of the present disclosure.

FIG. 9 shows a block diagram of a graph database design model 900 in accordance with embodiments of the present disclosure. In some embodiments, the Identity Analytics and Intelligence Engine 104 can provide a decentralized platform for distributed identity credential data in a manner that allows it to be treated as a knowledge base. This platform is a perfect match for the concepts and technologies associated with the Semantic Web. For instance, Semantic Web concepts and technologies were created to address how large amounts of small pieces of information distributed over a large number of internet-based sites can be analyzed and correlated to create a higher level of knowledge and insight. As described herein, the Identity Analytics and Intelligence Engine 104 is able to deal with the existence of a large number of small, distributed pieces of identity credential data that are not independent of each other. Thus, these small pieces of distributed identity credential data need to be related to each other to form a big picture view of the distributed identity credential data so that it can be treated as a global knowledge base for inferring cyber threat/attack information and activities. The global knowledge base is used by a set of automated Identity Analytics and Intelligence Engine 104 mechanisms for detecting, reporting, cueing, analyzing, correlating, and taking preventative actions to protect the network, trusted resources, and associated data.

The Identity Analytics and Intelligence Engine 104 may use a graph data structure to capture the distributed identity credential data and create a knowledge base. The RDF can be used to specify the canonical data model for the distributed identity credential data represented as graph nodes and edges. The graph nodes capture the small, seemingly independent, pieces of distributed identity credential data. Whereas, the graph edges represent relationships between the nodes, and the edges are the basis for creating knowledge connections. A graph database may be used to allow the distributed identity data to be collected, stored, queried, exchanged, and maintained as RDF triples. Additionally, identity credential related metadata is used to index the node and edge properties (or attributes) to allow for the fast query and retrieval of data sets to be used as input for data analytics and machine learning algorithms. In essence, the identity credential metadata provides the mechanism for management policies that make the graph database contents visible, accessible, and understandable for consumption by both humans and automated tools. A specific example of automated tools used by the Identity Analytics and Intelligence Engine 104 are machine-learning algorithms applied to the graph database information to discover the hidden patterns, unknown correlations, and other useful identity related knowledge.

As shown in FIG. 9 a detailed set of RDF triples that are captured within the Identity Analytics and Intelligence Engine graph database are illustrated. An RDF triple takes the form of a <subject, predicate, object>, and may be used to make statements about resources (in particular web resources). The subject denotes the resource; the predicate denotes traits (or properties) of the resource; the also predicate expresses a relationship between the subject and the object; and the object denotes another resource or a value. Some examples from FIG. 9 are the RDF triples defined by <Identity Credentials, Map-To, Subscriber> (shown as node "IC" 908 mapping to node "S" 136), <Subscriber, Requests-Services-From, Relying Party>, (shown as node "S" 136 requesting services from node "RP" 140) and <Relying Party, Produces, Recorded Behaviors> (shown as node "RP" 140 produces node "RB" 604). The RDF triples can be used as the basis for storing and composing the identity credential lifecycle data so that it can be easily queried. The RDF triples may be generated by the process described in conjunction with FIG. 10. Other nodes illustrated in FIG. 9 correspond to the ISP 120, the Protected System Resource (PSR) 544, the Usage Pattern (UP) 156, the Identity Token (IDT) 912, the Authorization Assertions (AA) 916, the Registration Key (RK) 920, the Authoritative Source (AS) 924, the Registration/Provisioning Authority (RPA) 112, and the Trust Policy (TP) 928, to name a few.

A common way to determine the consistency and completeness of RDF triples within a graph database model is to evaluate whether or not a set of example queries can be satisfied. Examples of identity credential lifecycle related queries that can be satisfied by the Identity Analytics and Intelligence Engine 104 can include, but are in no way limited to, the following: 1) Simple Queries—What Registration/Provisioning Authority did Subscriber "X" Register With? What Identity Credentials Map-To Subscriber X? What Identity Credentials Allow Access to Relying Party "X"? What are Subscriber "X" Identity Credentials Composed of? What Identity Service Provider Manages Subscriber "X" Identity Credentials? What Trust Policies does Subscriber "X" Comply With? What Usage Pattern has Subscriber "X" Generated? What Relying Parties has Subscriber "X" Requested Services From? What Identity Service Provider does Relying Party "X" Verify With? What Protected System Resources are Hosted By Relying Party "X"? What Recorded Behaviors are Produced By Protected System Resource "X"? and 2) Complex Queries—What Authoritative Sources were Accessed By the Registration/Provisions Authority to Provision Subscriber "X"? What Protected System Resources has Subscriber "X" Requested Services From? What Recorded Behaviors Produced by Identity Credential "X" Map-To Subscriber "Y"? What Protected System Resources are Aggregated Into Usage Pattern "X"? What Subscribers Map-To Authorization Assertion "X"? These simple and complex queries represent identity credential lifecycle data related to the types of points presented above. Specifically, relating identity credential lifecycle data to subscriber usage and behavior patterns.

The canonical data model for the identity credential lifecycle data is a key, unique feature of the Identity Analytics and Intelligence Engine 104. The canonical data model may be specified using JavaScript Object Notation-Linked Data (JSON-LD). JSON-LD may be used to provide a Java-based specification of the RDF triples using Java/JavaScript objects rather than other representations such as eXtended Markup Language (XML). JSON-LD is much more amenable to the development of Java-based algorithms and other automated capabilities, and JSON-LD may provide a more human-readable definition of the RDF triples. Both of these aspects allow the Identity Analytics and Intelligence Engine 104 to leverage a large body of open source, Java/JavaScript code for performing graph database manipulations and traversals, data analytics, and machine learning.

The canonical data model we have developed provides solutions to some very difficult questions regarding how to best create an automated process that collects and analyzes large amounts of highly distributed identity credential lifecycle information contained on the internet. Specifically, it allows the Identity Analytics and Intelligence Engine to create a set of distributed graph databases where each database can be configured to 1) reduce the amount of network traffic required to transfer identity credential lifecycle data and 2) exploit parallel processing capabilities for computational efficiency. The Identity Analytics and Intelligence Engine 104 can use the Apache Software Foundation capability to manage the set of distributed databases. Specifically, Storm may provide a Map-Reduce Engine that is a programming model for large-scale, distributed data processing. The Map part of the Storm Map-Reduce Engine is used to perform filtering and sorting to assist with the creation of data sets that contain the results of a query to the distributed graph databases. The Reduce part of the Storm Map-Reduce Engine is used to apply summarizing operations on the filtered, distributed data sets. For example, the Reduce part is used to apply machine learning algorithms that create usage and behavior patterns for a specified identity credential based on the filtered data created by the Map part.

One or more machine learning algorithms, as disclosed herein, may be applied to the data contained in the graph database. Examples of machine learning algorithms may include, but are in no way limited to, Decision Tree Learning, Inductive Logic Programming, Clustering, and Bayesian Networks to name a few. Each of these algorithms are further described below:

Decision Tree Learning:

Decision trees may be used as a predicative model to map observed usage patterns to conclusions about whether or not the observed usage patterns are indicative of cyber threat behaviors. Decision tree machine learning algorithms can be used within the Identity Analytics and Intelligence Engine 104 when anticipated usage patterns are well known and easy to describe. That is, a precise role has been defined for an identity credential, and this role can be used to define expected usage patterns.

Inductive Logic Programming

Inductive Logic Programming may be used to analyze combinations of security policy and security token assertions for toxic combinations. That is, an individual security policy or security token assertion can be well formed and allow for precise usage behaviors. However, when two or more of these security policies and/or security token assertions are combined (or aggregated) they may no longer be well-formed and unanticipated usage behaviors can occur. Inductive Logic Programming may be used within the Identity Analytics and Intelligence Engine 104 to analyze security policies and security token assertions for toxic combinations that allow unanticipated usage behaviors.

Clustering:

Clustering algorithms may be used to cluster observed usage patterns into subsets. Observed usage patterns in the same cluster represent similar behavior patterns while observed usage patterns in different clusters represent dissimilar behavior. Cluster algorithms can be used within the Identity Analytics and Intelligence Engine 104 to quickly learn and associate usage patterns with identity credential roles and token assertions. Additionally, clustering algorithms can be used to rapidly detect when a divergence is occurring from a historical usage patterns that indicates identity credential misuse is occurring.

Bayesian Networks:

Bayesian Networks may be used to represent a probabilistic relationship (or prediction) between usage patterns and potential cyber threat behaviors that indicate identity credential misuse. Bayesian Networks can be used within the Identity Analytics and Intelligence Engine 104 as an accurate predictor of identity credential misuse.

The architecture and design of the Identity Analytics and Intelligence Engine is built on a unique composition of open source tools and open source standards. These tools can include: JavaScript Object Notation-Linked Data (JSON-LD) to specify the graph-based canonical data model and metadata; the graph database (e.g., AllegroGraph, etc.); Apache SOLR/Lucene to provide fast indexing and searching based on the identity credential lifecycle metadata; Apache Mahout for the application of a wide variety of machine learning algorithms; Apache Storm to provide fast, distributed collection and dissemination of the cloud-hosted identity credential lifecycle data; and the use of existing identity credential and recorded system behavior information contained in Security Information and Event Management (STEM) and other types of server/system log files.

The analysis, correlation, reporting, and cueing components built on the open source tools provides the automated, knowledge-based capability to make identity credential lifecycle and other IT security related decisions. Additionally the tools are used to provide robust situational awareness and assessment with respect to subscriber behaviors within one or more Trust Frameworks. Open architecture and interface standards are used to create a plug-and-play capability that is hosted as an SaaS capability. By using a SaaS-based deployment capability, the Identity Analytics and Intelligence Engine has a neutral computing platform and is minimally invasive from the perspective of the businesses subscribing to the SaaS-based capability. Additionally, the use of open source products provides a large community of contributors from which new data analytics and machine learning algorithms and components from related efforts in semantic web, graph databases, data analytics, and machine learning can be quickly incorporated.

Figure 10:
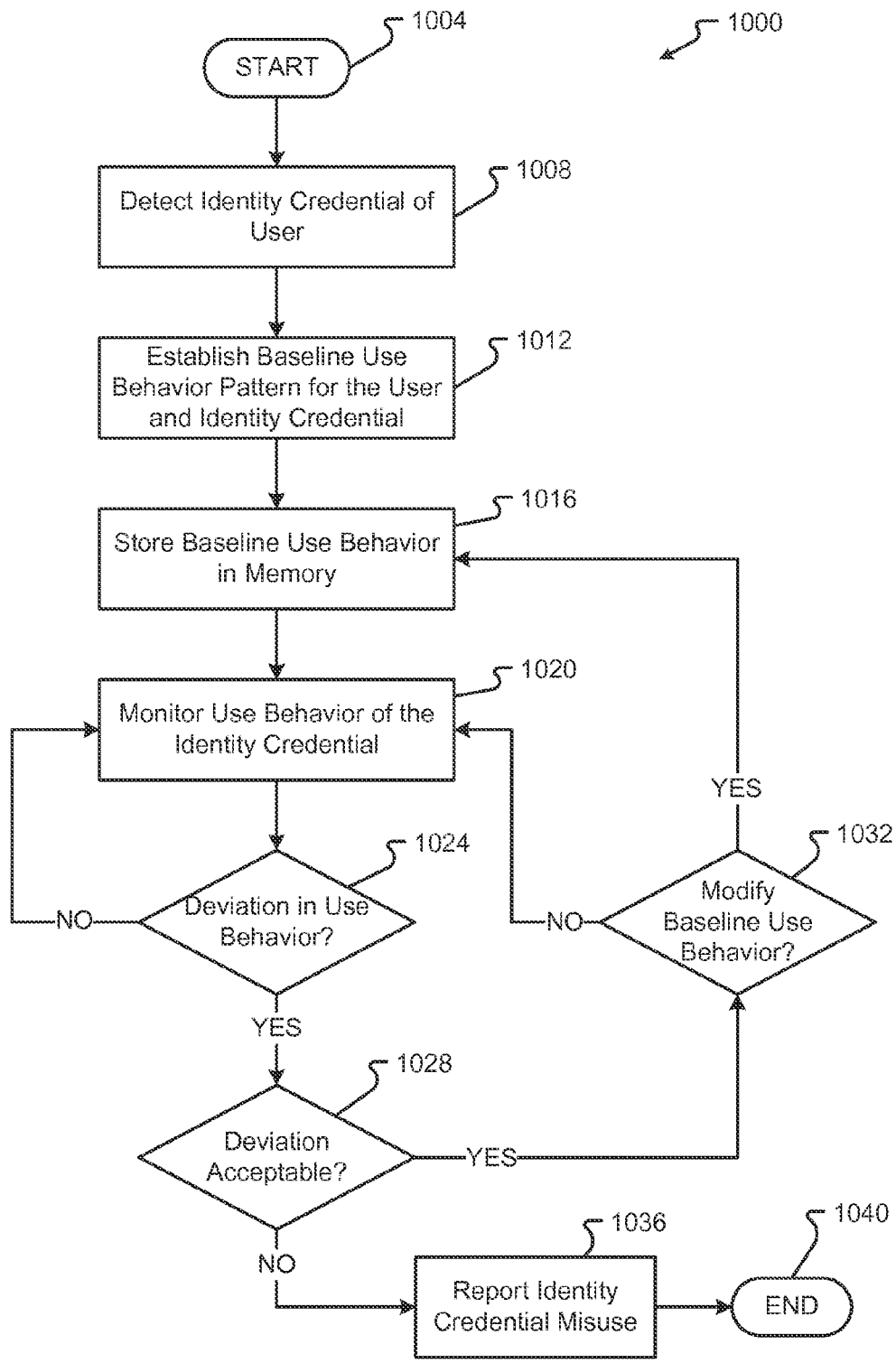
FIG. 10 is a flow or process diagram in accordance with embodiments of the present disclosure.

An embodiment of a method 1000 to determine and analyze subscriber behavior patterns is shown in FIG. 10. A general order for the steps of the method 1000 is shown in FIG. 10. Generally, the method 1000 starts with a start operation 1004 and ends with an end operation 1040. The method 1000 can include more or fewer steps or can arrange the order of the steps differently than those shown in FIG. 10. The method 1000 can be executed as a set of computer-executable instructions executed by a computer system and encoded or stored on a computer readable medium. Hereinafter, the method 1000 shall be explained with reference to the systems, components, modules, software, data structures, user interfaces, databases, etc. described in conjunction with FIGS. 1-9.

The method 1000 begins at step 1004 and proceeds by detecting the identity credential of a user or Subscriber 136 (step 1008). The Identity Analytics and Intelligence Engine 104 may then establish a baseline, or basis, use behavior for the Subscriber 136 and the detected identity credential 1012. The use behavior may correspond to one or more actions or inactions of the Subscriber 136 that are made over time. In any event, this baseline use behavior may be stored in a memory associated with the Identity Analytics and Intelligence Engine 104 (step 1016).

Next, the method 1000 may continue by monitoring the use behavior of the identity credential (step 1020). Monitoring use behavior may include collecting data corresponding to behavior patterns as described herein. For example, the Identity Analytics and Intelligence Engine 104 may monitor for event information related to one or more actions or inactions of a user with an identity credential. The method 1000 may then determine whether there is any deviation between the monitored use behavior and the baseline use behavior (step 1024). If no deviation is detected or determined, the method 1000 may return to step 1020 to continuously monitor the use behavior associated with the identity credential. However, if a deviation is determined, the Identity Analytics and Intelligence Engine 104 may determine whether the deviation is within an acceptable threshold or limits (step 1028). This determination may include referring to rules and/or trust policies in memory, where the threshold or limits are stored.

In the event that a deviation in use behavior is determined to be acceptable, or fall within acceptable limits, the Identity Analytics and Intelligence Engine 104 may determine to modify the baseline use behavior stored in memory (step 1032). This modification may include applying one or more machine learning algorithms to the data collected and/or stored in the graph database, as described herein. Modifying the baseline use behavior may include changing the baseline use behavior information stored in the memory associated with the Identity Analytics and Intelligence Engine 104. When a deviation in use behavior is determined to fall outside of the acceptable limits or threshold (e.g., the deviation is unacceptable, etc.), the method 1000 may proceed by reporting identity credential misuse (step 1036). In some embodiments, reporting misuse may include providing a notification to at least one of a Relying Party 140, a Subscriber 136, an administrator, monitor, or other entity.

In one embodiment, the notification may be automatically presented, or rendered, to a display associated with a communication device (e.g., a phone, tablet, computer, mobile computer, etc.). For instance, the notification may be sent as a text message or prompt configured to alert a user of the identity credential misuse. Continuing this example, a user may interact with the text message or prompt to take further action regarding the misuse. This interaction may include confirming that the reported misuse is true, providing a response that the reported misuse is a false report, updating access policies, and/or restricting particular access by identity credential. Although the method 1000 may end at step 1040, it should be appreciated that the use behavior associated with the misuse may be continually monitored by the Identity Analytics and Intelligence Engine 104.

It is an aspect of the present disclosure that reporting identity credential misuse may take a variety of forms. For example, reporting identity credential misuse may include rendering a new challenge question or verification element to a communication device (e.g., to the display of a communication device, in the form of a text message, as a prompt, etc.) associated with a credential user. The new challenge question may be created by one or more elements of the Trust Framework 108. For instance, rather than utilizing a stored challenge question (e.g., previously created and/or used by a user) the one or more elements of the Trust Framework 108 may review data in the Trust Framework 108 for generating a new challenge question. In some embodiments, this new challenge question may be based on usage, or use, patterns, stored data, and/or the like. As can be appreciated, a new challenge question having a unique answer that may only be known by the Trust Framework 108 and the user may serve to thwart identity theft via social engineering and/or other data gathering. Among other things, a challenge question that is not created by the user, or previously used, could not be easily retrieved by an identity thief or other entity employing a data gathering tool.

Additionally or alternatively, reporting may include automatically revoking authorization of identity credentials until further review. This revocation may include shutting down a resource, isolating a resource, and/or restricting access to or from a resource.

In some embodiments, the layered, Component Architecture for the Identity Analytics and Intelligence Engine 104 may be described as follows. Each layer may be separated by technology independent, open standards compliant interfaces. This separation can provide a set of abstraction layers that enable all components to be loosely coupled and thereby, easily replaceable as new technologies and other components become available. The architecture may comprise User Dashboard and Reporting, Identity Analytics and Intelligence Engine Services, Open Source Product Services, and/or Data Services.

User Dashboard and Reporting:

This layer is a robust user interface that can be built using web 2.0 concepts and technologies. It may be used to display various identity credential lifecycle data to include reporting, cues, alerts, reports, notifications and other types of information as described in the data flow description tables provided above. The dashboard may be monitored automatically, semi-automatically, or manually depending on the configuration. In some embodiments, the information and/or reporting provided to the dashboard may be accessed by one or more entities, including but not limited to, an administrator, a monitoring service, a trust framework host, a relying party, a user, and/or a subscriber. In some embodiments, the relying party or any other entity having access to the dashboard and reporting may be subject to certain restrictions as to what data is accessible and/or reviewable.

Identity Analytics and Intelligence Engine Services:

This layer implements the top-level capabilities and services that execute the continuous monitoring and user behavior characterization features. In general, these capabilities and services can be deployed either as SaaS interfaces or Secure API's.

Open Source Product Services:

This layer provides the abstract interfaces to the open source products such as the products provided by the Apache Software Foundation. These products can provide the indexing and searching (e.g., Apache Solr/Lucene), machine learning (Apache Mahout), and large-scale distributed data processing capabilities (Apache Storm).

Data Services:

This layer provides the abstract interfaces to the large amounts of data collected, analyzed, and correlated by the Identity Analytics and Intelligence Engine 104. Beneath this layer are the physical storage capabilities such as the AllegroGraph graph database and other types of NOSQL and SQL based databases.

The data structures maintained by the Data Services is a unique feature of the Identity Analytics and Intelligence Engine 104. These data structures can be used to: 1) represent training sets for the machine learning algorithms to learn anticipated subscriber behaviors, 2) capture subscriber usage and behavior patterns based on identity credential lifecycle data, and 3) provide the mechanisms to define and implement formal metrics that measure the variances/deviations between anticipated and unanticipated behaviors. The latter is of particular importance because it serves to minimize a potentially large number of "false positives" when formal metrics are not implemented and tied to the key data structures.

The canonical data model, data structures, and component architecture of the Identity Analytics and Intelligence Engine 104 can implement a more generic data/information lifecycle model. The current focus is on the identity credential lifecycle model along with the mechanisms to rapidly collect, analyze, correlate, and report on identity lifecycle knowledge obtained via our semantic web, graph database, data analytics, and machine learning framework. Other types of information lifecycles can also be modeled and processed by the framework.

For example, the data associated with a command and control (C2) system can be modeled. Each user of the command and control system would have expected/anticipated C2-related behaviors based on the information/knowledge contained on large-scale distributed networks. Suppose unanticipated behaviors were detected and reported by the lifecycle-modeling framework. Additionally, suppose the unanticipated behaviors required different IT subscriber authentication and authorization properties for their identity credential. By composing the identity credential lifecycle data with the C2 lifecycle data, it would be possible to define and implement the concept of "Adaptive Authentication and Access Control." That is, unanticipated behaviors detected and reported in the C2 lifecycle data are used to enable and authorize additional controlled behaviors in the identity credential lifecycle that enables the subscriber(s) to perform processing functions they wouldn't normally be authorized to perform. The concept of Adaptive Authentication and Access Control is being actively researched, but is unaware of any research that is applying data/information lifecycle modeling to support this type of capability.

The Identity Analytics and Intelligence Engine 104 can provide a solution to a rapidly escalating need for an automated process that connects together, correlates, and continuously monitors and manages an exponentially increasing number of highly distributed identity credentials across a large number of organizations. The Identity Analytics and Intelligence Engine 104 harvests large amounts of distributed identity credential lifecycle data from public/private clouds as well as the emerging Internet of Things. The Identity Analytics and Intelligence Engine 104 applies Semantic Web concepts and technologies to create a knowledge base of identity credential lifecycle data that can be rapidly analyzed to detect, prevent, and respond to data loss events, fraudulent transactions, and suspicious/unanticipated IT User behaviors based on their identity credentials.

Overall, the Identity Analytics and Intelligence Engine 104 can significantly shorten the detection, proactive prevention, and reaction times for identity credential misuse and related cyber threats/attacks. The Identity Analytic and Intelligence Engine 104 unlocks the identity credential lifecycle data from multiple distributed sources, links it with data loss prevention capabilities, and places the identity credential lifecycle data into a semantic web knowledge base. The knowledge base is leveraged as the mechanism to design and implement several innovative detection, prevention, and defensive capabilities that proactively instead of reactively address cyber threats/attacks.

Among other things, the Identity Analytics and Intelligence Engine 104 may be configured to: Continuously monitor usage behavior to quickly detect, proactively prevent, and respond to outlier/unanticipated user behaviors; Quantitatively measure the variance between normal usage and unanticipated usage behaviors in a manner that prevents an attack before it begins by determining what defensive measures to apply in an automated manner; Apply a tiered approach to allow multi-level, preventative analysis of usage patterns and behaviors; Provide a basis for automated reviews of user accounts for reasonability by using behavioral analysis to identify and protect against outlier/unanticipated activities; Assist with the deployment and management of sophisticated multi-factor access approaches; and/or Provide detailed insight into user access trends for web sites/applications, web services, and data services that provide a strong connection between user identity credential policies and their actual usage patterns, identity credential data attributes, and access privileges.

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The exemplary systems and methods of this disclosure have been described in relation to identity analysis systems and methods. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   collecting, via a processor, usage information associated with an identity credential of a user, wherein the usage information defines interactions of the user in a trust framework when the identity credential is used in the trust framework;
   applying, via the processor, at least one machine learning algorithm to the usage information collected;
   creating, via the processor and as a result of applying the at least one machine learning algorithm, two or more distributed graph databases, wherein each graph database stores identity credential lifecycle data defining a usage behavior and usage pattern for the user and the identity credential;
   determining, based on the identity credential lifecycle data, that subsequent usage information of the identity credential of the user fails to conform to the usage behavior and/or the usage pattern defined for the user and the identity credential; and
   sending a signal across a communication network to at least one receiving device in response to determining the subsequent usage information of the identity credential of the user fails to conform to the usage behavior and/or the usage pattern defined for the user and the identity credential.

2. The method of claim 1, wherein the at least one machine learning algorithm is applied in response to
   receiving a query associated with the identity credential lifecycle data of the identity credential.

3. The method of claim 2, further comprising:
   arranging, via the processor and in response to receiving the query, the identity credential lifecycle data in the two or more distributed graph databases into at least one data set.

4. The method of claim 3, wherein the identity credential lifecycle data includes a chronology of creation, ownership, and data updates associated with the identity credential.

5. The method of claim 1, further comprising:
   storing the usage behavior and the usage pattern for the identity credential in a computer readable memory associated with the identity credential.

6. The method of claim 5, further comprising:
   collecting, via the processor, subsequent usage information associated with the identity credential of the user, wherein the subsequent usage information defines subsequent interactions of the user in the trust framework when the identity credential is subsequently used in the trust framework;
   applying, via the processor, the at least one machine learning algorithm to the subsequent usage information collected; and
   updating, via the processor and as a result of applying the at least one machine learning algorithm, the identity credential lifecycle data stored in the two or more distributed graph databases to reflect an updated usage behavior and usage pattern for the user and the identity credential.

7. The method of claim 3, wherein arranging the identity credential lifecycle data in the two or more distributed graph databases, further comprises:
   filtering usage behavior and usage pattern information in the two or more distributed graph databases for the identity credential.

8. The method of claim 3, wherein arranging the identity credential lifecycle data in the two or more distributed graph databases, further comprises:
   sorting usage behavior and usage pattern information in the two or more distributed graph databases for the identity credential.

9. A method, comprising:
   collecting, via a processor, usage information associated with an identity credential of a user when the identity credential of the user is used in a trust framework;
   storing, in a computer readable memory, the usage information collected over time, wherein the usage information collected over time defines identity lifecycle data associated with the user and the identity credential, and wherein the identity lifecycle data further defines a historical use behavior associated with the user and the identity credential;
   determining, via the processor, an anticipated use behavior for the user and the identity credential based on the historical use behavior associated with the user and the identity credential;
   monitoring, via the processor, subsequent usage of the identity credential of the user;
   determining, via the processor, that the subsequent usage of the identity credential of the user includes a variation from the anticipated use behavior, and wherein the subsequent usage of the identity credential of the user is a misuse of the identity credential when the variation is determined to fall outside of an acceptable threshold set for the anticipated use behavior for the user and the identity credential; and
   sending a notification to a device across a communication network in the trust framework when the subsequent usage of the identity credential of the user is determined to be a misuse of the identity credential.

10. The method of claim 9, wherein the subsequent usage of the identity credential of the user includes at least one of a different subscriber authentication and different authorization property for the identity credential than a subscriber authentication and authorization property associated with the anticipated use behavior.

11. The method of claim 10, wherein the variation is determined to fall outside of the acceptable threshold set for the anticipated use behavior for the user and the identity credential, wherein the misuse of the identity credential is used to at least one of enable and authorize additional controlled behaviors in the identity credential lifecycle data, and wherein the additional controlled behaviors include a processing function unavailable to the anticipated use behavior.

12. A trust framework situated between a subscriber having an identity credential and a relying party that provides one or more computing resources to the subscriber based on identity authorization verifications received from the trust framework, the trust framework comprising:

an identity and intelligence engine that automatically performs the following:
  (i) collects usage information associated with the identity credential of the subscriber, wherein the usage information defines interactions of the subscriber including an exchange of identity credential information between the subscriber and the trust framework;
  (ii) maintains a canonical data model including usage information collected over time for the subscriber that is stored in a computer readable memory and represents identity credential lifecycle data related to the subscriber and the identity credential, wherein the identity credential lifecycle data defines a usage behavior and usage pattern for the subscriber and the identity credential;
  (iii) receives event information related to at least one of actions and inactions of the subscriber and catalogs the event information;
  (iv) compares the received event information with the canonical data model to determine whether or not the subscriber is acting in conformance with the canonical data model; and
  (v) in the event that the subscriber is determined to be acting out of conformance with the canonical data model, notifies the relying party thereby enabling the relying party to deny or restrict the subscriber's access to the one or more computing resources.

13. The trust framework of claim 12, wherein the canonical data model is maintained with information obtained from a plurality of different data sources.

14. The trust framework of claim 12, wherein the identity and intelligence engine further creates a set of distributed graph databases that represent the canonical data model.

15. The trust framework of claim 12, wherein a predetermined deviation between the at least one of actions and inactions and the canonical data model is provided to allow the subscriber to still be in conformance with the canonical data model even when the at least one of actions and inactions do not exactly match the canonical data model.

16. The trust framework of claim 12, wherein the identity and intelligence engine continuously and automatically updates the canonical data model with the at least one of actions and inactions when the subscriber is determined to be in conformance with the canonical data model.

17. The trust framework of claim 12, wherein the identity credential lifecycle data includes data related to the creation, ownership, data update, usage, and patterns of behaviors associated with the identity credential.

18. The trust framework of claim 12, wherein the received event information is compared in real-time.

19. The trust framework of claim 12, wherein notifying the relying party includes rendering an alert image to a computer display operated by the relying party.

20. The trust framework of claim 14, wherein the identity and intelligence engine automatically analyzes the canonical data in the graph databases using one or more machine learning algorithms.

* * * * *